United States Patent

(12) United States Patent
Yin et al.

(10) Patent No.: US 12,456,247 B2
(45) Date of Patent: Oct. 28, 2025

(54) RENDERING METHOD, DEVICE, AND RENDERING SYSTEM

(71) Applicant: Huawei Cloud Computing Technologies Co., Ltd., Guizhou (CN)

(72) Inventors: Qing Yin, Xi'an (CN); Kun Xie, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 211 days.

(21) Appl. No.: 18/338,835

(22) Filed: Jun. 21, 2023

(65) Prior Publication Data

US 2023/0351671 A1 Nov. 2, 2023

Related U.S. Application Data

(63) Continuation of application No. PCT/CN2021/133713, filed on Nov. 26, 2021.

(30) Foreign Application Priority Data

Dec. 21, 2020 (CN) .......................... 202011521452.6

(51) Int. Cl.
*G06T 15/00* (2011.01)
*G06T 15/20* (2011.01)
(52) U.S. Cl.
CPC ............ *G06T 15/005* (2013.01); *G06T 15/20* (2013.01)
(58) Field of Classification Search
CPC .............................. G06T 15/005; G06T 15/20
See application file for complete search history.

(56) References Cited

U.S. PATENT DOCUMENTS

| 2011/0227938 | A1 | 9/2011 | Lan et al. |
| 2013/0278599 | A1 | 10/2013 | Xu et al. |
| 2018/0033203 | A1 | 2/2018 | Ligameri et al. |
| 2018/0052595 | A1* | 2/2018 | Parmar ............... G06F 3/04815 |
| 2019/0019303 | A1* | 1/2019 | Siver ........................ G01S 17/08 |
| 2020/0026484 | A1* | 1/2020 | Allen ...................... G09G 5/373 |
| 2021/0042991 | A1* | 2/2021 | Wei .......................... G06T 15/20 |

FOREIGN PATENT DOCUMENTS

| CN | 102196300 A | 9/2011 |
| CN | 110163943 A | 8/2019 |
| CN | 111191060 A | 5/2020 |
| CN | 111381967 A | 7/2020 |

* cited by examiner

*Primary Examiner* — Michelle Chin
(74) *Attorney, Agent, or Firm* — Conley Rose, P.C.

(57) ABSTRACT

A rendering method includes receiving a first rendering request and a second rendering request, where the first rendering request indicates a target scene and a first angle at which the target scene is observed, and the second rendering request indicates the target scene and a second angle at which the target scene is observed; performing non-angle-of-view-related processing on data of the target scene by using the rendering engine, to obtain non-angle-of-view processed data; performing, based on the first angle at which the target scene is observed and the non-angle-of-view processed data, subsequent processing including angle-of-view-related processing to obtain a first rendered image; and performing subsequent processing including angle-of-view-related processing to obtain a second rendered image.

20 Claims, 20 Drawing Sheets

Target scene

First angle of view

Second angle of view

Before rasterization           After rasterization

Rendered image

RENDERING METHOD, DEVICE, AND RENDERING SYSTEM

CROSS-REFERENCE TO RELATED APPLICATIONS

This is a continuation of International Patent Application No. PCT/CN2021/133713 filed on Nov. 26, 2021, which claims priority to Chinese Patent Application No. 202011521452.6 filed on Dec. 21, 2020, the disclosure of which is hereby incorporated by reference in its entirety.

TECHNICAL FIELD

This application relates to the three-dimensional rendering field, and in particular, to a rendering method, a device, and a rendering system.

BACKGROUND

Rendering is a process of generating an image from a model by using software. The model describes a three-dimensional (3D) object by using a strictly defined language or data structure, and includes geometry, viewpoint, texture, and lighting information. The image is a digital image or a bitmap image. The term "rendering" is similar to "rendering a scene by an artist". In addition, the rendering is also used to describe "a process of calculating an effect in a video editing file to generate final video output". The rendering may include pre-rendering (pre-rendering/offline rendering) or real-time rendering (real-time rendering/online rendering). The pre-rendering is usually used for a real-scene simulation with a predetermined script, such as a movie or an advertisement. The real-time rendering is usually used for a real-time simulation without a predetermined script, such as flight training, a 3D game, or an interactive building demonstration. Rasterization rendering is usually used for real-time rendering. However, the rasterization rendering has a great computing amount, resulting in a waste of a large quantity of resources.

SUMMARY

This application provides a rendering method, a device, and a rendering system, to effectively save computing resources.

According to a first aspect, a rendering method is provided. The method is applied to a rendering application server. The rendering application server belongs to a rendering system. The rendering system includes a rendering application client and a rendering engine. The rendering application server and the rendering engine are deployed on a remote rendering node. The method includes receiving a first rendering request and a second rendering request, where the first rendering request indicates a target scene and a first angle at which the target scene is observed, and the second rendering request indicates the target scene and a second angle at which the target scene is observed; performing non-angle-of-view-related processing on data of the target scene by using the rendering engine, to obtain non-angle-of-view processed data; performing, based on the first angle at which the target scene is observed and the non-angle-of-view processed data by using the rendering engine, subsequent processing including angle-of-view-related processing, to obtain a first rendered image; and performing, based on the second angle at which the target scene is observed and the non-angle-of-view processed data by using the rendering engine, subsequent processing including angle-of-view-related processing, to obtain a second rendered image.

In some possible designs, the performing non-angle-of-view-related processing on data of the target scene by using the rendering engine to obtain non-angle-of-view processed data includes invoking, by using the rendering engine, a target image rendering pipeline to perform non-angle-of-view-related processing on the data of the target scene.

In some possible designs, the non-angle-of-view-related processing does not include processing related to the first angle at which the target scene is observed or the second angle at which the target scene is observed.

In some possible designs, the angle-of-view-related processing includes processing related to the first angle at which the target scene is observed or the second angle at which the target scene is observed.

In some possible designs, the non-angle-of-view-related processing includes one or more of a vertex specification, vertex shader processing, tessellation, and a geometry shader, and the angle-of-view-related processing includes one or more of cutting and culling.

In some possible designs, the first rendering request includes an identifier of the target scene and the first angle at which the target scene is observed; or geometry data, texture data, and material data of some or all grids in the target scene and the first angle at which the target scene is observed.

In some possible designs, the second rendering request includes the identifier of the target scene and the second angle at which the target scene is observed; or geometry data, texture data, and material data of some or all grids in the target scene and the second angle at which the target scene is observed.

According to a second aspect, a rendering application server is provided. The rendering application server includes a communication module and a rendering module.

The communication module is configured to receive a first rendering request and a second rendering request, where the first rendering request indicates a target scene and a first angle at which the target scene is observed, and the second rendering request indicates the target scene and a second angle at which the target scene is observed.

The rendering module is configured to perform non-angle-of-view-related processing on data of the target scene by using the rendering engine, to obtain non-angle-of-view processed data.

The rendering module is configured to perform, based on the first angle at which the target scene is observed and the non-angle-of-view processed data by using the rendering engine, subsequent processing including angle-of-view-related processing, to obtain a first rendered image.

The rendering module is configured to perform, based on the second angle at which the target scene is observed and the non-angle-of-view processed data by using the rendering engine, subsequent processing including angle-of-view-related processing, to obtain a second rendered image.

In some possible designs, the performing non-angle-of-view-related processing on data of the target scene by using the rendering engine, to obtain non-angle-of-view processed data includes: invoking, by using the rendering engine, a target image rendering pipeline to perform non-angle-of-view-related processing on the data of the target scene.

In some possible designs, the non-angle-of-view-related processing does not include processing related to the first angle at which the target scene is observed or the second angle at which the target scene is observed.

In some possible designs, the angle-of-view-related processing includes processing related to the first angle at which the target scene is observed or the second angle at which the target scene is observed.

In some possible designs, the non-angle-of-view-related processing includes one or more of a vertex specification, vertex shader processing, tessellation, and a geometry shader, and the angle-of-view-related processing includes one or more of cutting and culling.

In some possible designs, the first rendering request includes an identifier of the target scene and the first angle at which the target scene is observed; or geometry data, texture data, and material data of some or all grids in the target scene and the first angle at which the target scene is observed.

In some possible designs, the second rendering request includes the identifier of the target scene and the second angle at which the target scene is observed; or geometry data, texture data, and material data of some or all grids in the target scene and the second angle at which the target scene is observed.

According to a third aspect, a rendering system is provided. The rendering system includes a rendering application server, a rendering application client, and a rendering engine. The rendering application server and the rendering engine are deployed on a remote rendering node.

The rendering application server is configured to receive a first rendering request and a second rendering request, where the first rendering request indicates a target scene and a first angle at which the target scene is observed, and the second rendering request indicates the target scene and a second angle at which the target scene is observed.

The rendering application server is configured to perform non-angle-of-view-related processing on data of the target scene by using the rendering engine, to obtain non-angle-of-view processed data.

The rendering application server is configured to perform, based on the first angle at which the target scene is observed and the non-angle-of-view processed data by using the rendering engine, subsequent processing including angle-of-view-related processing, to obtain a first rendered image.

The rendering application server is configured to perform, based on the second angle at which the target scene is observed and the non-angle-of-view processed data by using the rendering engine, subsequent processing including angle-of-view-related processing, to obtain a second rendered image.

In some possible designs, the performing non-angle-of-view-related processing on data of the target scene by using the rendering engine, to obtain non-angle-of-view processed data includes: invoking, by using the rendering engine, a target image rendering pipeline to perform non-angle-of-view-related processing on the data of the target scene.

In some possible designs, the non-angle-of-view-related processing does not include processing related to the first angle at which the target scene is observed or the second angle at which the target scene is observed.

In some possible designs, the angle-of-view-related processing includes processing related to the first angle at which the target scene is observed or the second angle at which the target scene is observed.

In some possible designs, the non-angle-of-view-related processing includes one or more of a vertex specification, vertex shader processing, tessellation, and a geometry shader, and the angle-of-view-related processing includes one or more of cutting and culling.

In some possible designs, the first rendering request includes an identifier of the target scene and the first angle at which the target scene is observed; or geometry data, texture data, and material data of some or all grids in the target scene and the first angle at which the target scene is observed.

In some possible designs, the second rendering request includes the identifier of the target scene and the second angle at which the target scene is observed; or geometry data, texture data, and material data of some or all grids in the target scene and the second angle at which the target scene is observed.

According to a fourth aspect, a computing node is provided. The computing node includes a processor and a memory. The processor executes a program in the memory, to perform the method according to any one of the first aspect or the possible designs of the first aspect.

According to a fifth aspect, a computer-readable storage medium is provided, including instructions. When the instructions run on a computing node, the computing node is enabled to perform the method according to any one of the first aspect or the possible designs of the first aspect.

According to a sixth aspect, a computer program product is provided. When the computer program product is read and executed by a computer, the method according to any one of the first aspect or the possible designs of the first aspect is performed.

In the foregoing solutions, when the first rendering request and the second rendering request indicate the same target scene, the non-angle-of-view-related processing needs to be performed only once, so that a computing amount required for rendering can be effectively reduced.

BRIEF DESCRIPTION OF DRAWINGS

To describe the technical solutions in embodiments of this application or in the background more clearly, the following describes the accompanying drawings for describing the embodiments of this application or the background.

DESCRIPTION OF EMBODIMENTS

Figure 1A:
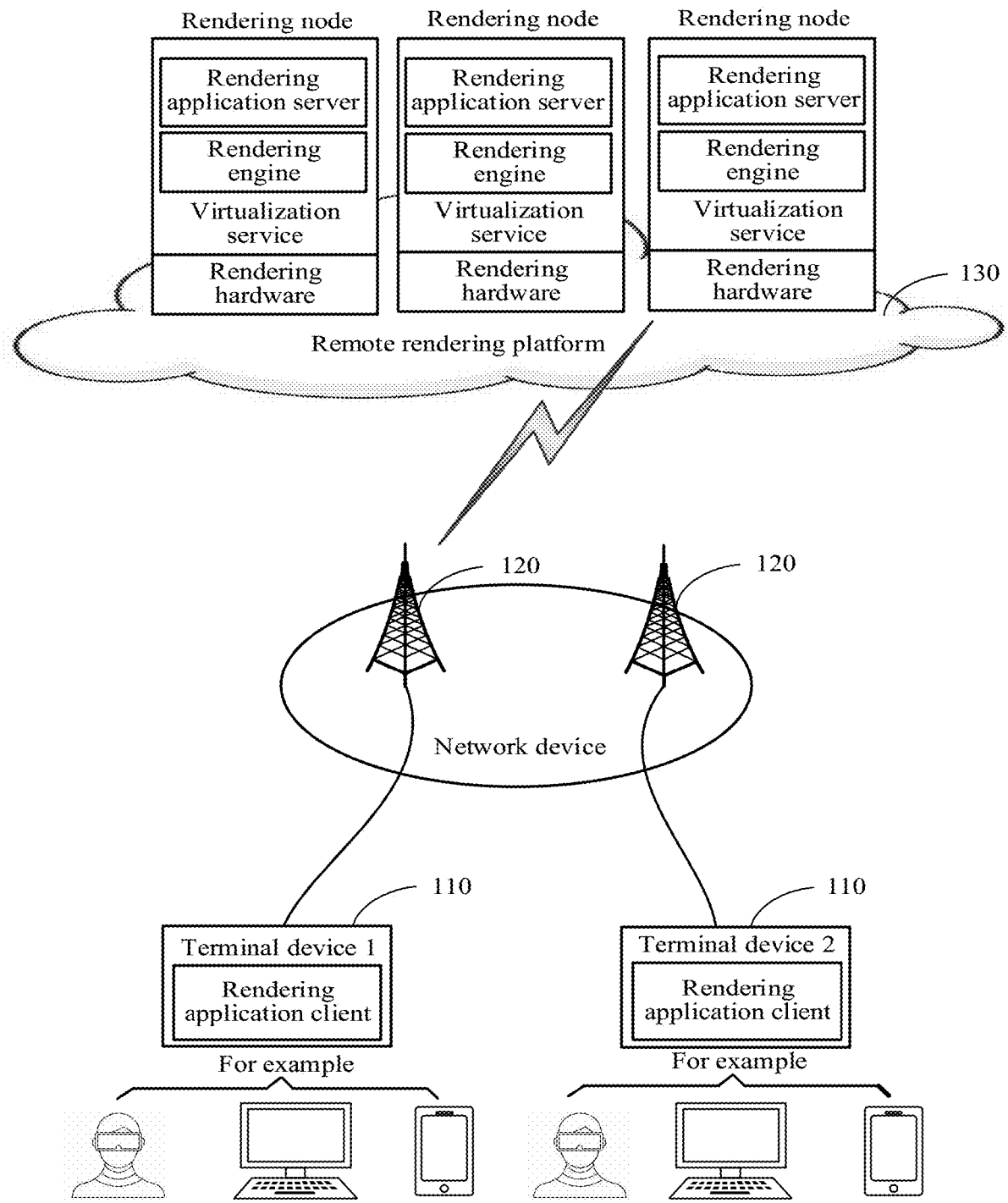
FIG. 1A and FIG. 1B are schematic diagrams of structures of some rendering systems according to this application.

FIG. 1A is a schematic diagram of a structure of a rendering system according to this application. The rasterization rendering system in this application is configured to render a 3D model of a target scene by using a rendering method, to obtain a two-dimensional (2D) image, namely, a rendered image. The rendering method may include rasterization rendering or the like. The rasterization rendering system in this application may include a plurality of terminal devices 110 and network devices 120, and a remote rendering platform 130. The remote rendering platform 130 may be specifically deployed on a public cloud. The remote rendering platform 130 and the terminal device 110 are usually deployed in different data centers or even in different geographical areas.

The terminal device 110 may be a device that needs to display a rendered image in real time, for example, may be a virtual reality (VR) device used for flight training, or may be a computer used for a virtual game, or a smartphone used for a virtual mall. This is not specifically limited herein. The terminal device may be a high-configuration and high-performance (for example, multi-core, high-dominant-frequency, or large-memory) device, or may be a low-configuration and low-performance (for example, single-core, low-dominant-frequency, or small-memory) device. In a specific embodiment, the terminal device 110 may include hardware, an operating system, and a rendering application client.

The network device 120 is configured to transmit data between the terminal device 110 and the remote rendering platform 130 by using a communication network of any communication mechanism/communication standard. The communication network may be in a form of a wide area network, a local area network, point-to-point connection, or any combination thereof.

The remote rendering platform 130 includes a plurality of remote rendering nodes. Each remote rendering node includes rendering hardware, a virtualization service, a rendering engine, and a rendering application from bottom to top. The rendering hardware includes a computing resource, a storage resource, and a network resource. The computing resource may be a heterogeneous computing architecture, for example, may be a central processing unit (CPU)+graphics processing unit (GPU) architecture, a CPU+artificial intelligence (AI) chip architecture, or a CPU+GPU+AI chip architecture. This is not specifically limited herein. The storage resource may include a memory or the like. The network resource may include a network adapter or the like. The virtualization service is a service of pooling resources of a plurality of physical hosts to form a unified resource pool by using a virtualization technology, and flexibly isolating mutually independent resources based on a requirement of a user to run an application of the user. Commonly, the virtualization service may include a virtual machine (VM) service and a container service. The rendering engine may be configured to implement an image rendering algorithm. The rendering application server may be configured to invoke the rendering engine to complete rendering for a rendered image.

The rendering application client in the terminal device 110 and the rendering application server in the remote rendering platform 130 are collectively referred to as a rendering application. Common rendering applications may include a game application, a VR application, a movie special effect, an animation, and the like. The user enters an instruction by using the rendering application client. The rendering application client translates the instruction into data, and sends the data to the rendering application server. After processing the data, the rendering application server provides a result, and then the rendering application client translates the result into graphical data and presents the graphical data to the user. It may be considered that the rendering application client is an intermediary between the user and the rendering application server. In a specific implementation, the rendering application server may be provided by a rendering application provider, the rendering application client may be provided by the rendering application provider, and the rendering engine may be provided by a cloud service provider. For example, the rendering application may be a game application. A game developer of the game application installs a game application server on the remote rendering platform provided by the cloud service provider. The game developer of the game application provides a game application client for the user through the Internet, so that the user downloads and installs the game application client in the terminal device of the user. In addition, the cloud service provider further provides the rendering engine. The rendering engine can provide a computing capability for the game application. In another specific implementation, the rendering application client, the rendering application server, and the rendering engine may be all provided by the cloud service provider.

Figure 1B:
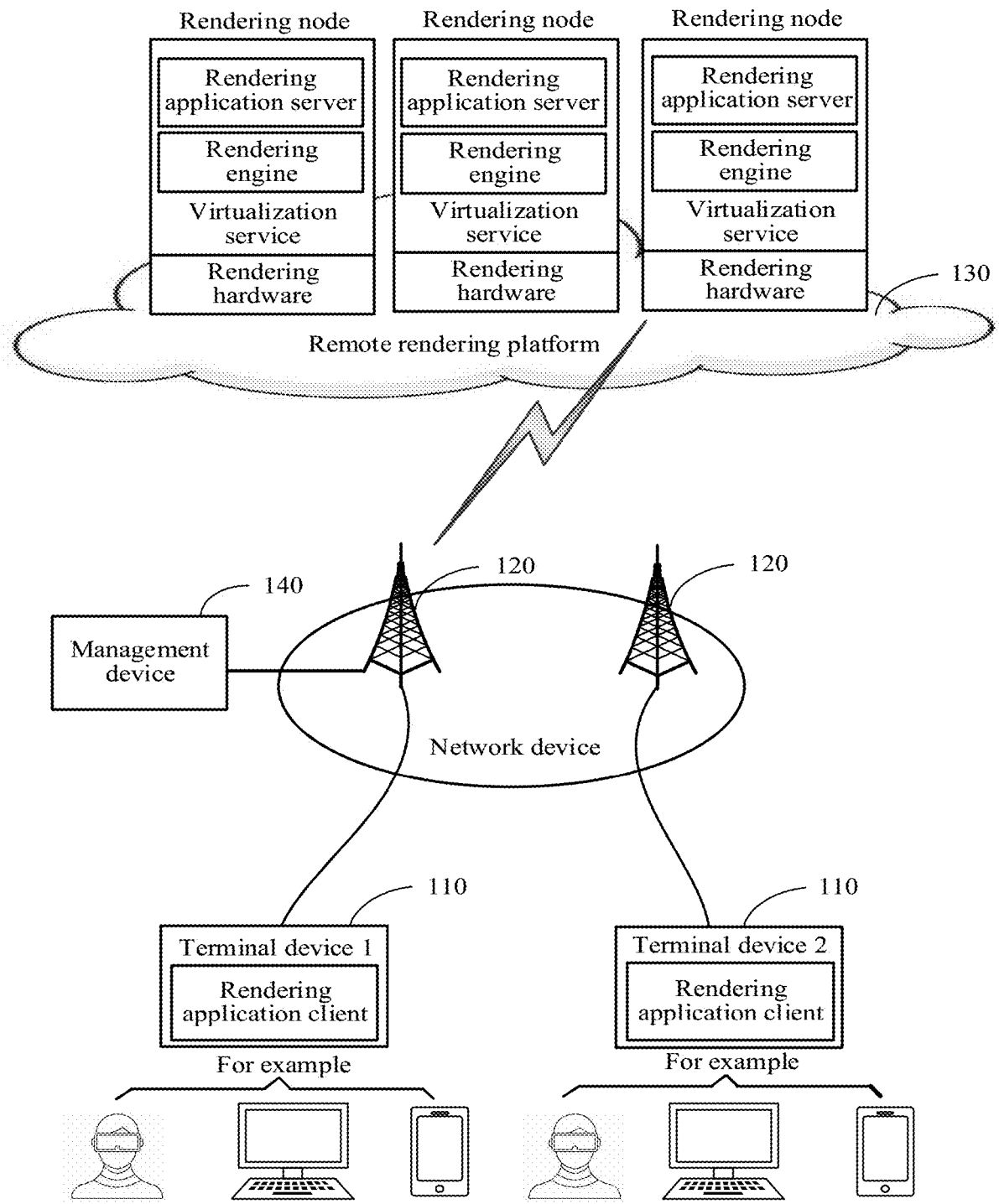

A rasterization rendering system shown in FIG. 1B further includes a management device 140. The management device 140 may be a device provided by a third party other than a terminal device of a user or a remote rendering platform 130 of a cloud service provider. For example, the management device 140 may be a device provided by a game developer. The game developer may manage a rendering application by using the management device 140. For example, the game developer may specify, by using the management device 140, image quality of an initial rendered image provided by a rendering application server for a rendering application client. It may be understood that the management device 140 may be disposed on the remote rendering platform, or may be disposed outside the remote rendering platform. This is not specifically limited herein.

Figure 2:
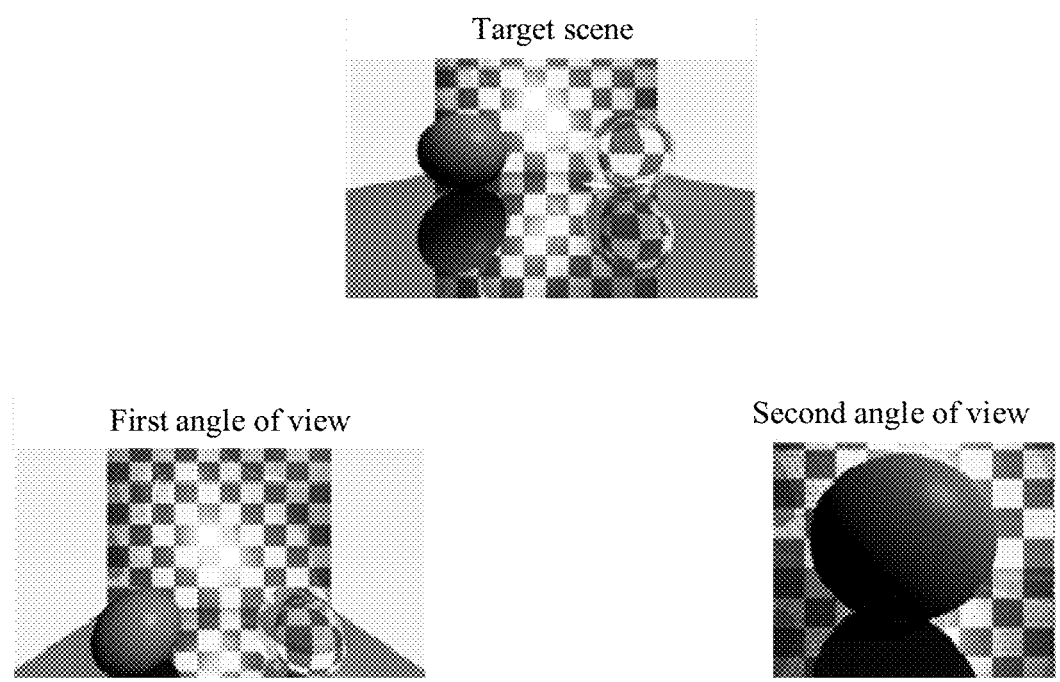
FIG. 2 is a schematic diagram of viewing a target scene from a plurality of angles according to this application.

In a virtual scene in which a plurality of users participate, to enable each user to have a sense of reality in the virtual scene, different users usually need rendered images of a same target scene that are generated from different angles. The target scene includes a light source and a three-dimensional model. Light produced by the light source is projected into the three-dimensional model. As shown in FIG. 2, it is assumed that the target scene is shown in an upper part in FIG. 2. When a first user of a terminal device 1 observes the target scene from a first angle of view, a rendered image that needs to be generated is shown on a left side in FIG. 2. When a second user of a terminal device 2 observes the target scene from a second angle of view, a rendered image that needs to be generated is shown on a right side in FIG. 2. The terminal device 1 and the terminal device 2 may separately perform rasterization rendering on the target scene by using resources of a remote rendering platform 130, to obtain rendered images at different angles. Details are as follows:

The terminal device 1 sends a first rendering request to the remote rendering platform 130 by using a network device 120, and the remote rendering platform 130 invokes a rendering engine to perform rasterization rendering on the target scene from an angle of view of the first user based on the first rendering request, to obtain a rendered image that is of the target scene and that is generated from the angle of view of the first user. The first rendering request is used to indicate the first angle of view and the target scene.

The terminal device 2 sends a second rendering request to the remote rendering platform 130 by using a network device 120, and the remote rendering platform 130 invokes the rendering engine to perform rasterization rendering on the target scene from an angle of view of the second user based on the second rendering request, to obtain a rendered image that is of the target scene and that is generated from the angle of view of the second user. The second rendering request is used to indicate the second angle of view and the target scene.

Figure 3:
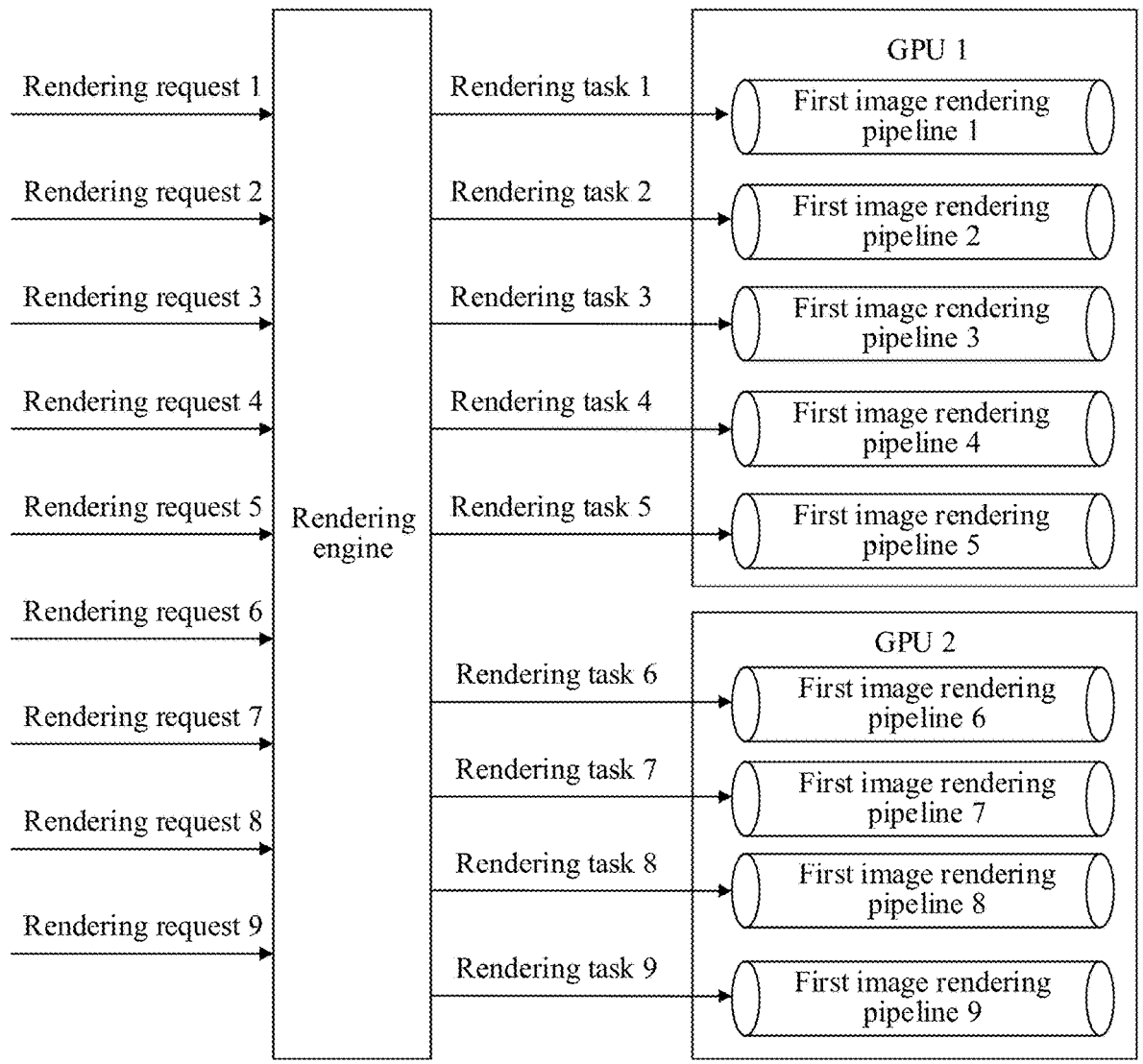
FIG. 3 is a schematic diagram of scheduling a plurality of rendering requests for execution by a plurality of first image rendering pipelines according to this application.

A process in which a remote rendering platform performs rasterization rendering may be as follows. As shown in FIG. 3, after receiving concurrent rendering requests 1 to 9 (not shown in the figure) sent by rendering application clients, a rendering application server transfers the rendering requests 1 to 9 to a rendering engine. The rendering engine generates a rendering task 1 based on the rendering request 1, generates a rendering task 2 based on the rendering request 2, . . . , and generates a rendering task 9 based on the rendering request 9. Then, the rendering engine schedules, based on the rendering task 1, a first image rendering pipeline 1 to execute the rendering task 1, to obtain a rendered image 1; schedules, based on the rendering task 2, a first image rendering pipeline 2 to execute the rendering task 2, to obtain a rendered image 2; . . . , and schedules, based on the rendering task 9, a first image rendering pipeline 9 to execute the rendering task 9, to obtain a rendered image 9. In addition, different rendering requests respectively occupy different first image rendering pipelines, for example, the rendering requests 1 to 9 respectively occupy the first image rendering pipelines 1 to 9, even though the different rendering requests are used to render a same target scene at different angles.

Figure 4:
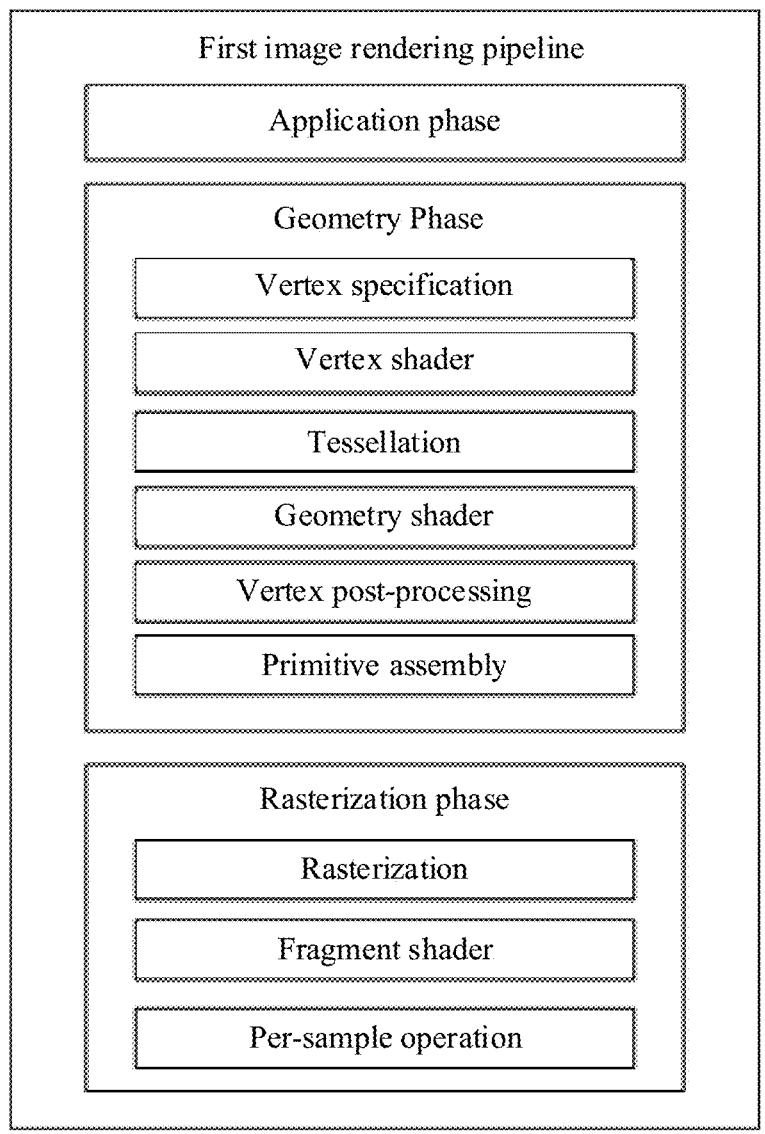
FIG. 4 is a schematic diagram of a structure of a first image rendering pipeline according to this application.

FIG. 4 is a schematic diagram of a structure of a first image rendering pipeline according to this application. As shown in FIG. 4, the first image rendering pipeline provided in this application usually includes an application phase, a geometry phase, and a rasterization phase.

In the application phase, collision detection, an acceleration algorithm, input detection, animation, force feedback, texture animation, transformation, simulation, geometry deformation, and some calculations that are not performed in other phases usually may be implemented.

The geometry phase usually includes a plurality of sub-phases such as a vertex specification, a vertex shader, tessellation, a geometry shader, vertex post-processing, primitive assembly, rasterization, a fragment shader, and a per-sample operation.

The vertex specification is usually used to obtain vertex data. The vertex data is generated based on a three-dimensional model in a target scene. The vertex data includes three-dimensional coordinates of a vertex, and the vertex data may further include a normal vector of the vertex, a color of the vertex, and the like. The vertex may be a point in the three-dimensional model, for example, a place at which two sides of a polygon intersect in the three-dimensional model, or a common endpoint of two sides in the three-dimensional model.

Figure 5:
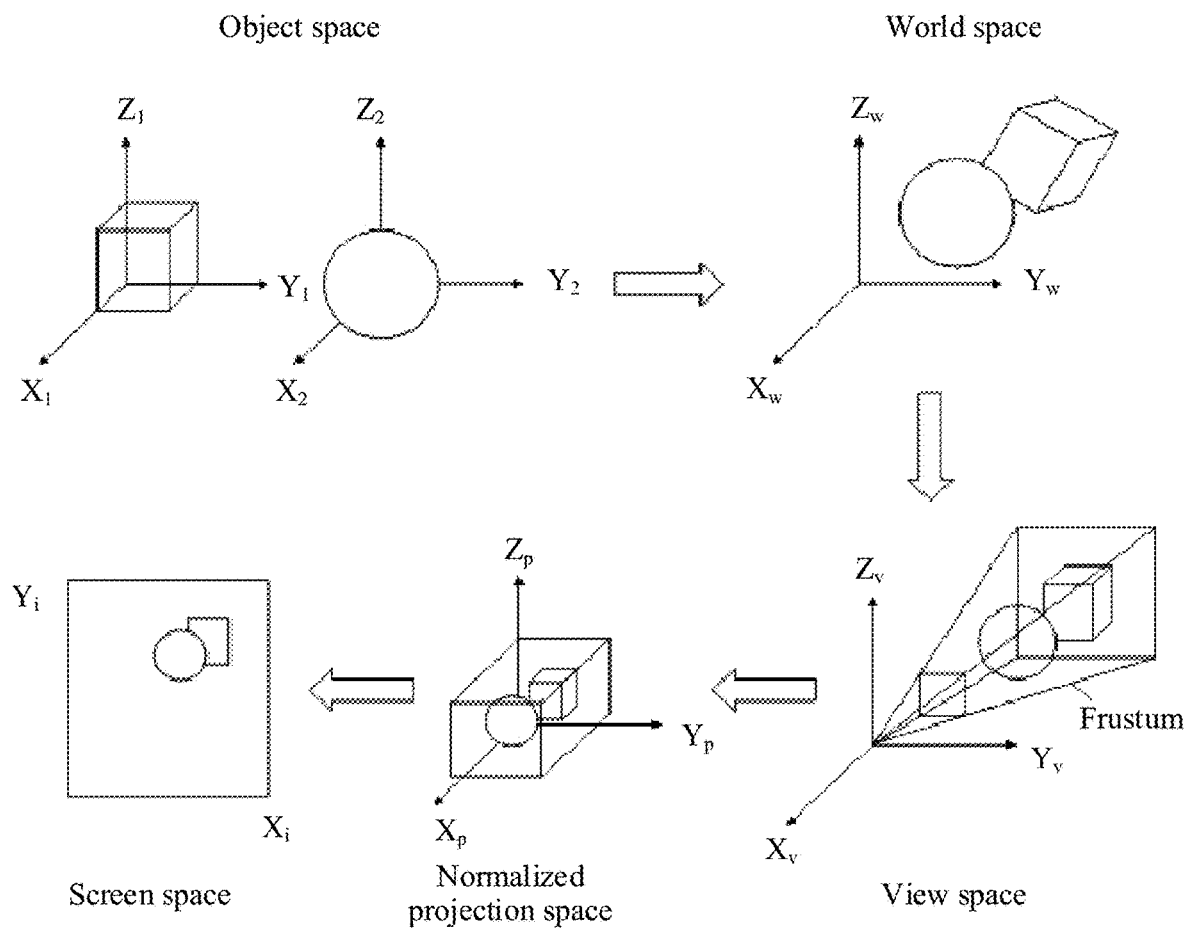
FIG. 5 is a schematic diagram of a transformation process of a vertex shader according to this application.

The vertex shader is usually used to transform three-dimensional coordinates of a vertex from an object space to a screen/image space. As shown in FIG. 5, a transformation process may include transformation from the object space to a world space, transformation from the world space to a view space, transformation from the view space to a normalized projection space, and transformation from the normalized projection space to the screen space. The view space includes a frustum. A space inside the frustum is a space that can be seen from an angle of a user, and a space outside the frustum is a space that cannot be seen from the angle of the user.

Figure 6:
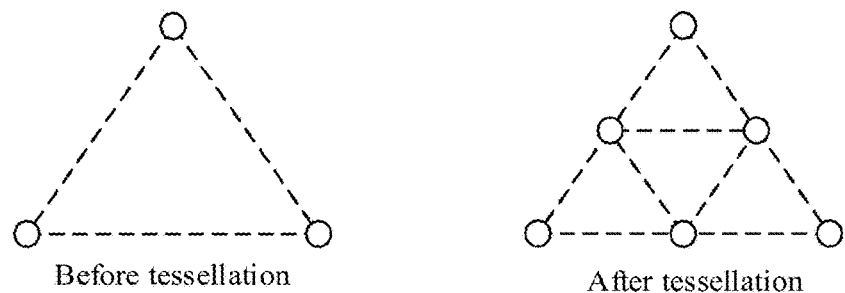
FIG. 6 is a schematic diagram of tessellation according to this application.

The tessellation is used to greatly increase a quantity of vertices in a three-dimensional model. As shown in FIG. 6, it is assumed that the three-dimensional model includes three vertices that form a triangle. Before tessellation, as shown on a left side in FIG. 6, the three-dimensional model has three vertices. After tessellation, as shown on a right side in FIG. 6, the quantity of vertices in the three-dimensional model changes from three to six. It may be learned that the three-dimensional model is rough and rigid before tessellation, and the three-dimensional model is realistic and vivid after tessellation.

The geometry shader is used to transform one or more vertices in a three-dimensional model into completely different primitives (primitive), to generate more vertices.

Figure 7:
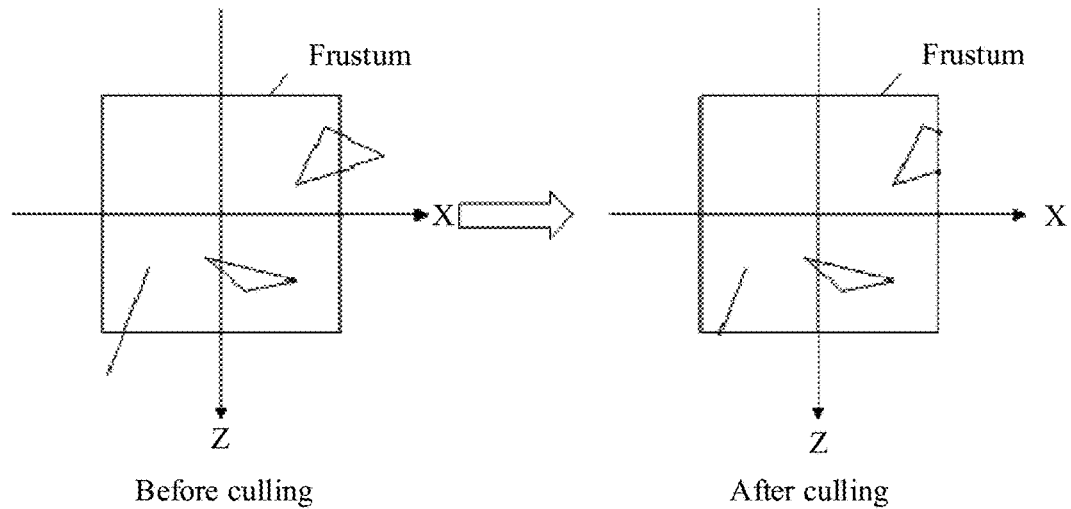
FIG. 7 is a schematic diagram of cutting according to this application.

The vertex post-processing is used to cut a primitive. That is, if a part of the primitive is outside a frustum and a part of the primitive is inside the frustum, the part of the primitive outside the frustum needs to be cut, and only the part inside the frustum is retained. For example, as shown in FIG. 7, a left half part in FIG. 7 and a right half part in FIG. 7 are respectively schematic diagrams obtained before primitives outside the frustum are cut and after primitives outside the frustum are cut. As shown in the left half part in FIG. 7, before cutting, one half of a line segment in a lower left corner is located outside the frustum, and the other half is located inside the frustum; and one half part of a triangle in an upper right corner is located outside the frustum, and the other half is located inside the frustum. As shown in the right half part in FIG. 7, after cutting, the part of the line segment in the lower left corner outside the frustum is cut off, and a new vertex is generated at an intersection of the line segment in the lower left corner and the frustum; and the part of the triangle in the upper right corner outside the frustum is cut off, and two new vertices are generated at intersections of two sides of the triangle in the upper right corner and the frustum.

Figure 8:
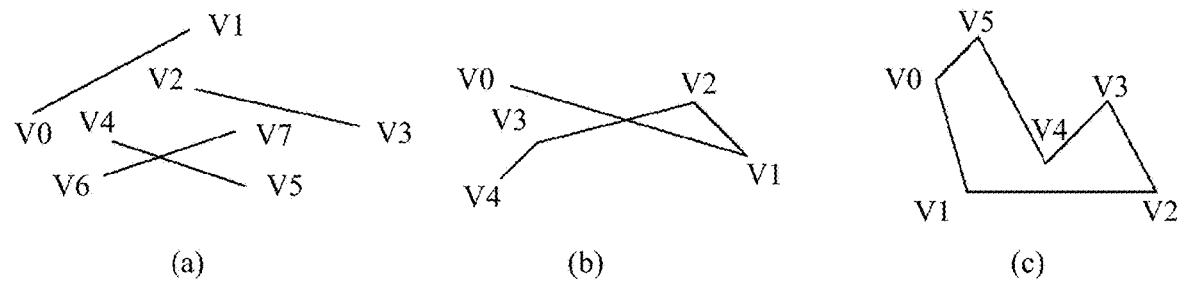
FIG. 8 is a schematic diagram of line segment assembling according to this application.
Figure 9:
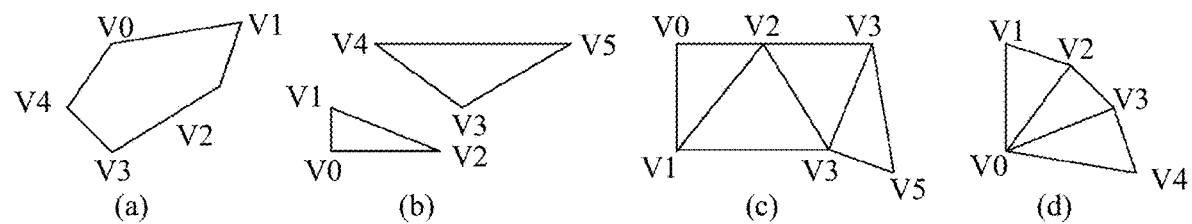
FIG. 9 is a schematic diagram of triangle assembling according to this application.

The primitive assembly is usually used to assemble vertices in a three-dimensional model into geometry primitives. This phase generates a series of triangles, line segments, and points. As shown in FIG. 8, assembled line segments may include (a) independent line segments; (b) line segments that are connected end to end but not closed at last; or (c) line segments that are connected end to end and closed at last. As shown in FIG. 9, assembled triangles may include (a) a polygon obtained through sequential connection based on definitions of points; (b) triangles obtained by drawing one triangle by using every three points as one combination starting from the first point, where the triangles are independent of each other; (c) triangles obtained by drawing one triangle by using each point and two previous points as one combination starting from the third point, namely, a linear continuous triangle string; or (d) triangles obtained by drawing one triangle by using each point, a previous point, and the first point as one combination starting from the third point, namely, a fan-shaped continuous triangle. In this phase, culling may be further performed, that is, an invisible object is removed from a scene. Herein, the culling may include frustum culling, viewport culling, and occlusion culling.

A rasterization phase includes the rasterization, the fragment shader, and the per-sample operation.

Figure 10:
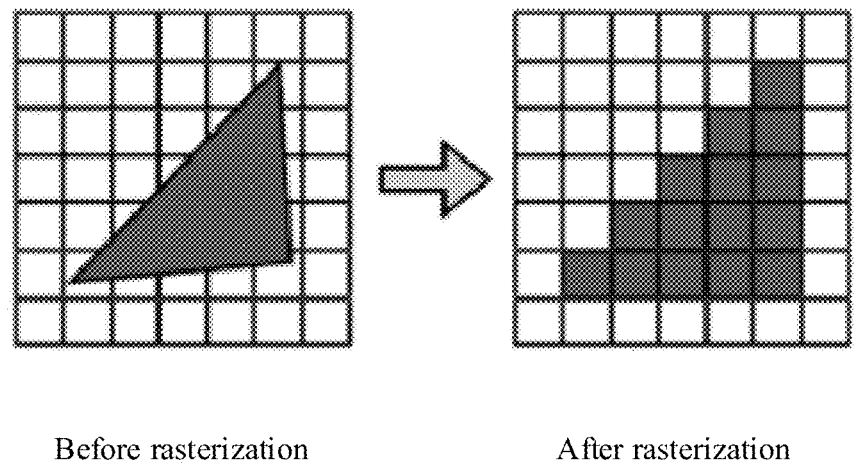
FIG. 10 is a schematic diagram of rasterization according to this application.

The rasterization is a process of converting vertex data into a slice, can be used to convert a graph into an image including grids, and has a characteristic that each element corresponds to one pixel in a frame buffer. Therefore, first work of the rasterization is: as shown in FIG. 10, determining which integral grid areas in window coordinates are occupied by a primitive; and second work is allocating one color value and one depth value to each area. The rasterization process produces slices.

The fragment shader is used to calculate final color output of a pixel.

The per-sample operation includes depth testing and transparency processing. It may be understood that if a closer object is first drawn, and then a farther object is drawn, the farther object may cover the closer object because of being drawn later. This effect is not expected. The depth testing is actually recording a distance between a pixel and a camera in a 3D world (drawing coordinates). A depth buffer stores a depth value (Z value) of each pixel (drawn on a screen), and a larger depth value indicates a longer distance from the camera. Therefore, after the depth buffer is used, an order of drawing objects is not so important, and all the objects can be normally displayed based on distances (Z values).

However, a large quantity of computing resources needs to be consumed for generating, by a remote rendering platform, a first rendered image from an angle of view of a first user by using a first image rendering pipeline, and generating a second rendered image from a second angle of view of a second user by using a first image rendering pipeline.

To resolve the foregoing problem, this application provides a rasterization rendering method, a device, and a rasterization rendering system, to effectively reduce required computing resources.

This application proposes a second image rendering pipeline, to divide processing in a first image rendering pipeline into two parts: non-angle-of-view-related processing and subsequent processing. The second image rendering pipeline includes only the non-angle-of-view-related processing, and does not include the subsequent processing. The subsequent processing includes angle-of-view-related processing. The non-angle-of-view-related processing is processing unrelated to an angle of view of a user, and the angle-of-view-related processing is processing related to the angle of view of the user. In non-angle-of-view-related processing, although an angle at which a first user observes a target scene is different from an angle at which a second user observes a target scene, processing is the same because the target scenes are the same. However, in angle-of-view-related processing, although the target scenes are the same, processing is different because the angle at which the first user observes the target scene is different from the angle at which the second user observes the target scene.

Figure 11A:
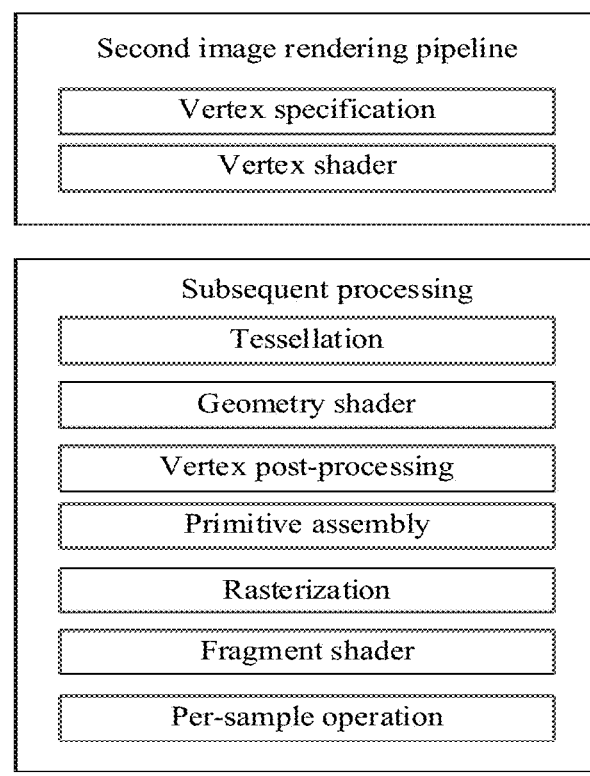
FIG. 11A to FIG. 11C are schematic diagrams of some second image rendering pipelines according to this application.
Figure 11B:
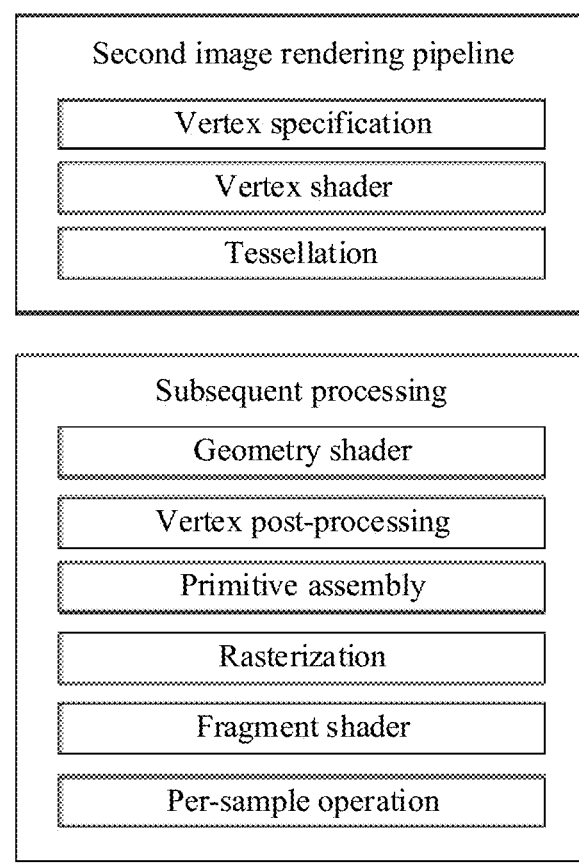
Figure 11C:
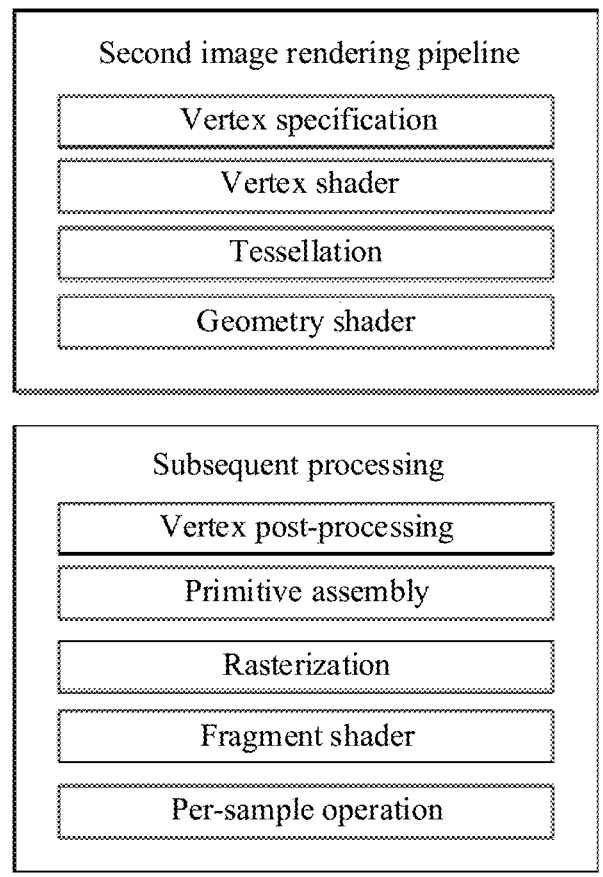

FIG. 11A to FIG. 11C are schematic diagrams of some second image rendering pipelines according to this application. As shown in FIG. 11A to FIG. 11C, the second image rendering pipeline may include the following several implementations:

In a first implementation, as shown in FIG. 11A, non-angle-of-view-related processing in the second image rendering pipeline may include a vertex specification and a vertex shader. Subsequent processing may include tessellation, a geometry shader, vertex post-processing, primitive assembly, rasterization, a fragment shader, and a per-sample operation. Angle-of-view-related processing includes cutting and culling. The cutting may occur in any phase in the tessellation, the vertex post-processing, and the primitive assembly, and the culling may occur in the primitive assembly phase.

In a second implementation, as shown in FIG. 11B, non-angle-of-view-related processing in the second image rendering pipeline may include a vertex specification, a vertex shader, and tessellation. Subsequent processing may include a geometry shader, vertex post-processing, primitive assembly, rasterization, a fragment shader, and a per-sample operation. Angle-of-view-related processing includes cutting and culling. The cutting may occur in any phase in the geometry shader, the vertex post-processing, and the primitive assembly, and the culling may occur in the primitive assembly phase.

In a third implementation, as shown in FIG. 11C, non-angle-of-view-related processing in the second image rendering pipeline may include vertex shader processing, tessellation, and a geometry shader. Subsequent processing may include vertex post-processing, primitive assembly, rasterization, a fragment shader, and a per-sample operation. Angle-of-view-related processing includes cutting and culling. The cutting may occur in any phase in the vertex post-processing and the primitive assembly, and the culling may occur in the primitive assembly phase.

In addition to the foregoing embodiments, the non-angle-of-view-related processing may further include some other angle-of-view-unrelated processing. For example, processing (excluding cutting processing) of assembling vertices in a three-dimensional model into points, line segments, and triangles in the primitive assembly may also be set in the non-angle-of-view-related processing.

Figure 12:
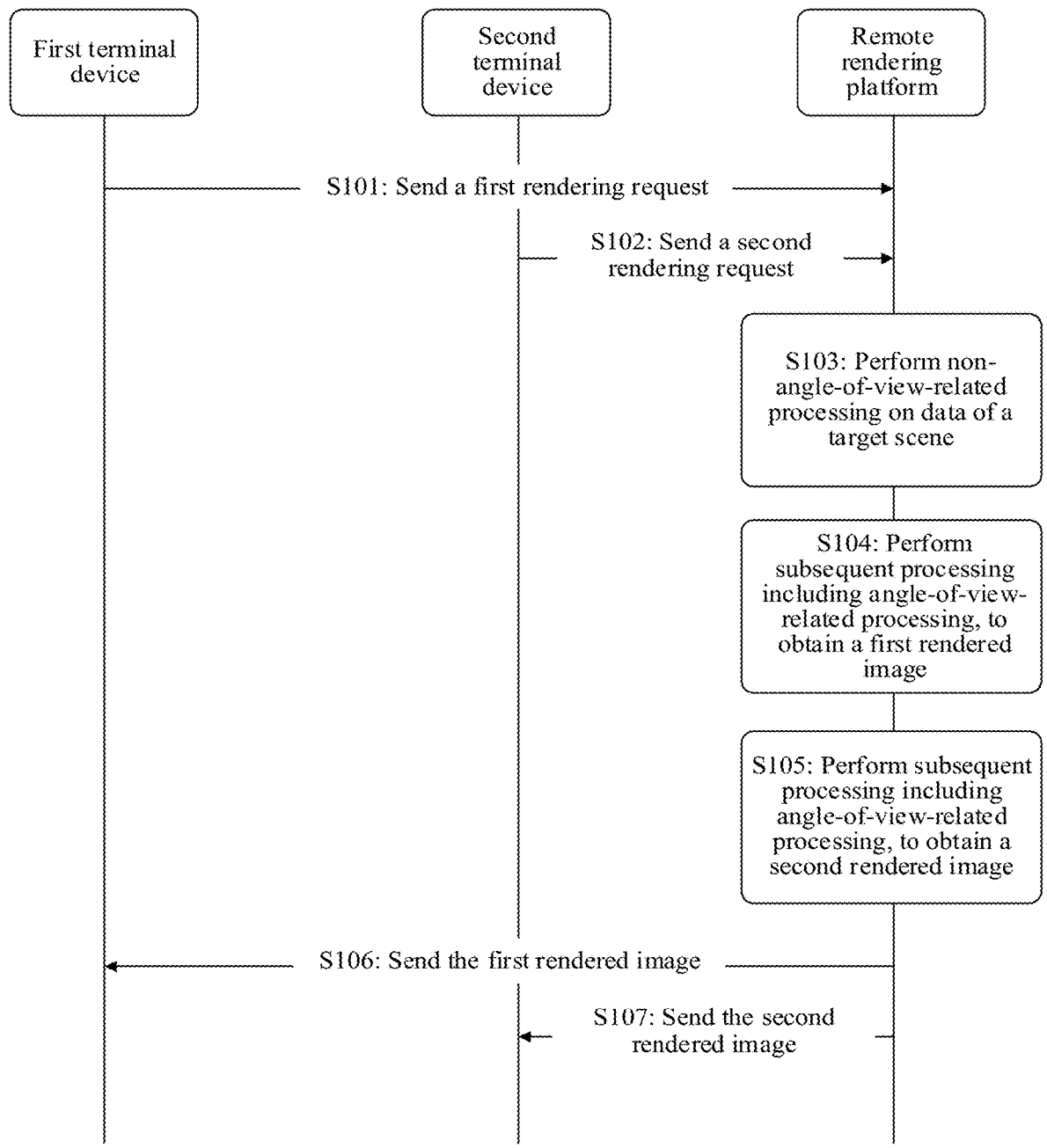
FIG. 12 is a schematic flowchart of a rasterization rendering method according to this application.

FIG. 12 is a schematic flowchart of a rasterization rendering method according to this application. As shown in FIG. 12, the rasterization rendering method in this implementation includes the following steps.

S101: A rendering application client of a first terminal device sends a first rendering request to a rendering application server of a remote rendering platform. Correspondingly, the rendering application server of the remote rendering platform receives the first rendering request sent by the rendering application client of the first terminal device. The first rendering request is used to indicate a target scene and an angle at which a first user observes the target scene.

Figure 13:
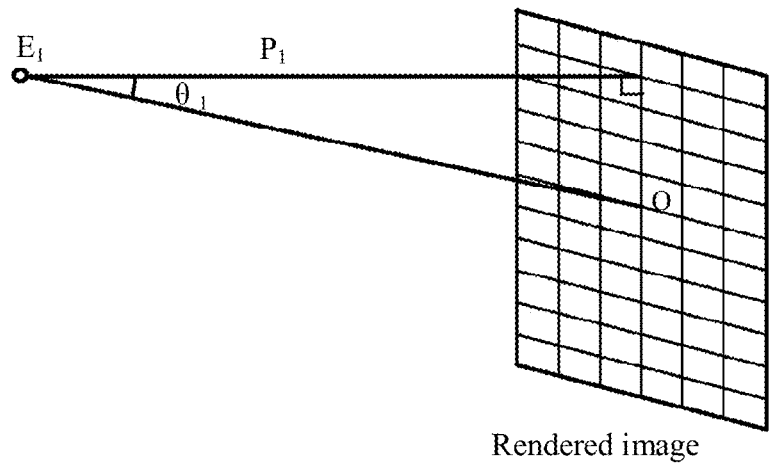
FIG. 13 is a schematic diagram of an angle at which a first user observes a target scene according to this application.

In a specific embodiment of this application, the first rendering request may include the following implementations:

In a first manner, the first rendering request includes an identifier of the target scene and the angle at which the first user observes the target scene. It may be understood that the remote rendering platform may pre-store a correspondence between the identifier of the target scene and data such as geometry data, texture data, and material data of the target scene. Therefore, the remote rendering platform may find the corresponding data of the target scene by using the identifier of the target scene, to perform rendering. The geometry data may include vertex data of each grid in the target scene, or the like. The texture data may include a color of each grid in the target scene, or the like. The material data may include a material, for example, a metal, specular, or diffuse reflection material, of each grid in the target scene, or the like. As shown in FIG. 13, the angle at which the first user observes the target scene may be represented as $(P_1, \theta_1)$, where $P_1$ is a vertical distance from a viewpoint $E_1$ of the first user to a rendered image, and $\theta_1$ is an included angle between a connection line from the viewpoint $E_1$ to a central point O of the rendered image and a horizontal line.

In a second manner, the first rendering request includes geometry data, texture data, and material data of the target scene and the angle at which the first user observes the target scene. For example, the first rendering request may include all geometry data, texture data, and material data of the target scene and the angle at which the first user observes the target scene. Alternatively, the first rendering request may include changed geometry data, texture data, and material data of the target scene relative to a previous scene and the angle at which the first user observes the target scene. It may be understood that, in this case, the remote rendering platform may not need to pre-store a correspondence between the identifier of the target scene and the geometry data, the texture data, and the material data of the target scene.

S102: A rendering application client of a second terminal device sends a second rendering request to the rendering application server of the remote rendering platform. Correspondingly, the rendering application server of the remote rendering platform receives the second rendering request sent by the rendering application client of the second terminal device. The second rendering request is used to indicate the target scene and an angle at which a second user observes the target scene.

In a specific embodiment of this application, content included in the second rendering request is similar to the content included in the first rendering request. For details, refer to the description of the first rendering request. Details are not described herein.

S103: A rendering engine of the remote rendering platform invokes a second image rendering pipeline to perform non-angle-of-view-related processing on data of the target scene, to obtain non-angle-of-view processed data.

S104: The remote rendering platform performs, based on the angle at which the first user observes the target scene and the non-angle-of-view processed data by using the rendering engine, subsequent processing including angle-of-view-related processing, to obtain a first rendered image.

S105: The remote rendering platform performs, based on the angle at which the second user observes the target scene and the non-angle-of-view processed data by using the rendering engine, subsequent processing including angle-of-view-related processing, to obtain a second rendered image.

S106: The rendering application server of the remote rendering platform sends the first rendered image to the rendering application client of the first terminal device. Correspondingly, the rendering application client of the first terminal device receives the first rendered image sent by the rendering application server of the remote rendering platform.

S107: The rendering application server of the remote rendering platform sends the second rendered image to the rendering application client of the second terminal device. Correspondingly, the rendering application client of the second terminal device receives the second rendered image sent by the rendering application server of the remote rendering platform.

In a specific embodiment of this application, after receiving the first rendering request and the second rendering request, the remote rendering platform generates a combined rendering task based on the first rendering request and the second rendering request, and invokes the second image rendering pipeline to perform non-angle-of-view-related processing to obtain the non-angle-of-view processed data. In other words, a common combined rendering task is generated for the first rendering request and the second rendering request generate, and the same second image rendering pipeline is used to perform non-angle-of-view-related processing to obtain the non-angle-of-view processed data. Then, the remote rendering platform makes two copies of the non-angle-of-view processed data. One copy is used to perform subsequent processing with reference to the angle at which the first user observes the target scene, to obtain the first rendered image. The other copy is used to perform subsequent processing with reference to the angle at which the second user observes the target scene, to obtain the second rendered image. The following describes step S103 to step S105 in detail with reference to FIG. 11A to FIG. 11C.

Figure 14A:
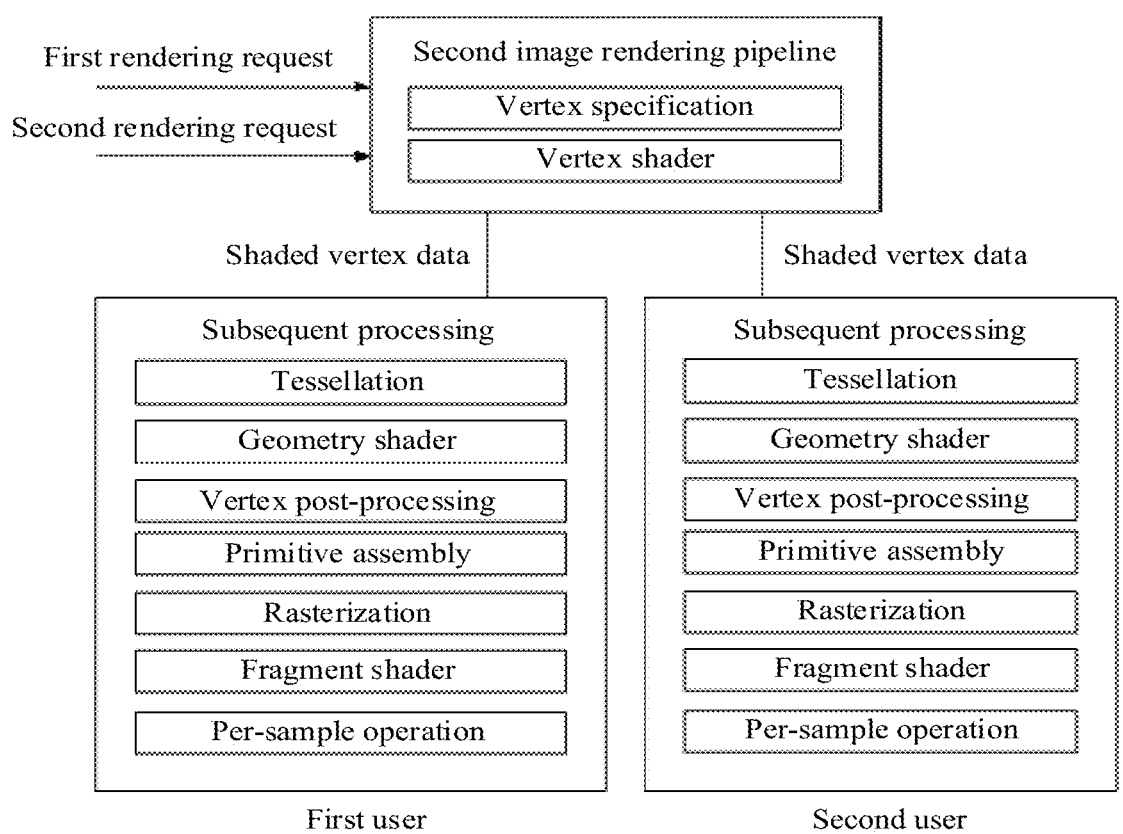
FIG. 14A to FIG. 14C are schematic diagrams of performing rendering by using second image rendering pipelines that respectively correspond to FIG. 11A to FIG. 11C according to this application.

In a specific embodiment, detailed description is performed with reference to the second image rendering pipeline shown in FIG. 11A. As shown in FIG. 14A, after receiving the first rendering request and the second rendering request, the remote rendering platform invokes the second image rendering pipeline to perform vertex specification and vertex shader processing on the data of the target scene to obtain shaded vertex data. Then, the remote rendering platform makes two copies of the shaded vertex data. The remote rendering platform performs tessellation, a geometry shader, vertex post-processing (including cutting), primitive assembly (including culling), rasterization, a fragment shader, and a per-sample operation based on the angle at which the first user observes the target scene and a first copy of the shaded vertex data, to obtain the first rendered image. The remote rendering platform performs tessellation, a geometry shader, vertex post-processing (including cutting), primitive assembly (including culling), rasterization, a fragment shader, and a per-sample operation based on the angle at which the second user observes the target scene and a second copy of the shaded vertex data, to obtain the second rendered image. In other words, although the remote rendering platform receives the first rendering request and the second rendering request, the remote rendering platform performs vertex specification and vertex shader processing only once, so that computing resources can be effectively saved.

Figure 14B:
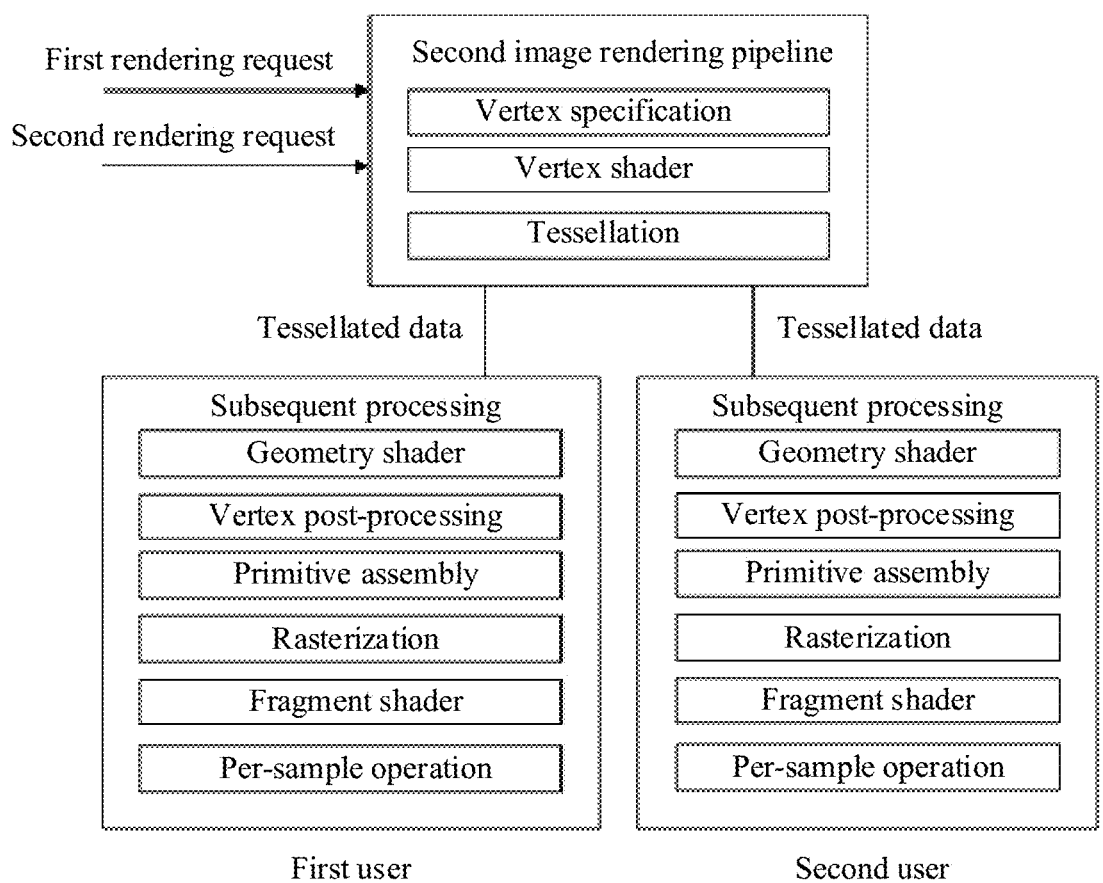

In a specific embodiment, detailed description is performed with reference to the second image rendering pipeline shown in FIG. 11B. As shown in FIG. 14B, after the remote rendering platform receives the first rendering request and the second rendering request, the remote rendering platform performs vertex specification, vertex shader, and tessellation processing on the data of the target scene, to obtain tessellated data. The remote rendering platform makes two copies of the tessellated data. Then, the remote rendering platform performs a geometry shader, vertex post-processing (including cutting), primitive assembly (including culling), rasterization, a fragment shader, and a per-sample operation based on the angle at which the first user observes the target scene and a first copy of the tessellated data, to obtain the first rendered image. The remote rendering platform performs a geometry shader, vertex post-processing (including cutting), primitive assembly (including culling), rasterization, a fragment shader, and a per-sample operation based on the angle at which the second user observes the target scene and a second copy of the tessellated data, to obtain the second rendered image. In other words, although the remote rendering platform receives the first rendering request and the second rendering request, the remote rendering platform performs vertex specification, vertex shader, and tessellation processing only once, so that computing resources can be effectively saved.

Figure 14C:
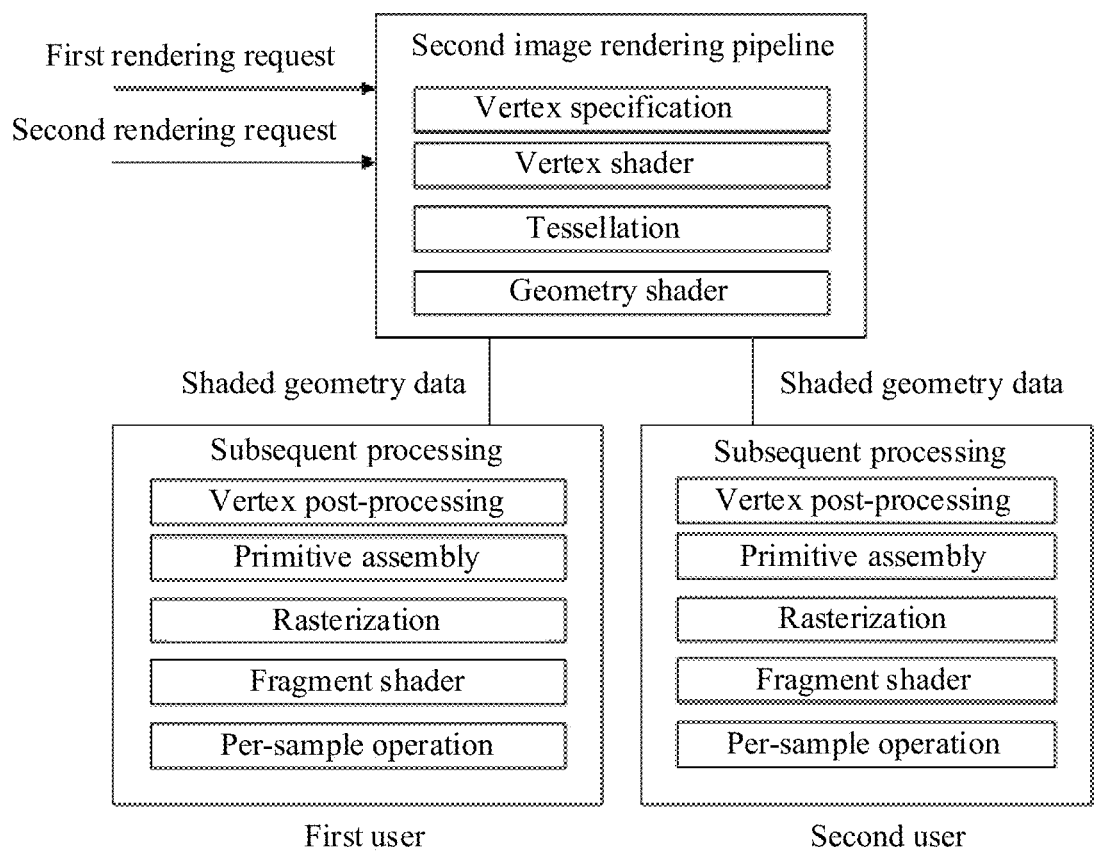

In a specific embodiment, detailed description is performed with reference to the second image rendering pipeline shown in FIG. 11C. As shown in FIG. 14C, after the remote rendering platform receives the first rendering request and the second rendering request, the remote rendering platform performs vertex specification, vertex shader, tessellation, and geometry shader processing on the data of the target scene, to obtain shaded geometry data. The remote rendering platform makes two copies of the shaded geometry data. Then, the remote rendering platform performs vertex post-processing (including cutting), primitive assembly (including culling), rasterization, a fragment shader, and a per-sample operation based on the angle at which the first user observes the target scene and a first copy of the shaded geometry data, to obtain the first rendered image. The remote rendering platform performs vertex post-processing (including cutting), primitive assembly (including culling), rasterization, a fragment shader, and a per-sample operation based on the angle at which the second user observes the target scene and a second copy of the shaded geometry data, to obtain the second rendered image In other words, although the remote rendering platform receives the first rendering request and the second rendering request, the remote rendering platform performs vertex specification, vertex shader, tessellation, and geometry shader processing only once, so that computing resources can be effectively saved.

It may be understood that, if a third terminal device and a fourth terminal device also exist in a rendering system, the third terminal device and the fourth terminal device also need to render the target scene, to obtain a third rendered image and a fourth rendered image. In this case, the remote rendering platform also needs to perform non-angle-of-view-related processing only once, and does not need to separately perform non-angle-of-view-related processing four times, so that wasted computing resources can be more effectively reduced.

It may be understood that, one third image rendering pipeline may also be invoked for subsequent processing corresponding to each rendering request.

In a specific embodiment of this application, the remote rendering platform may enable a first thread to establish the second image rendering pipeline to perform non-angle-of-view-related processing on the data of the target scene, to obtain the non-angle-of-view processed data; may enable a second thread to perform, based on the angle at which the first user observes the target scene and the non-angle-of-view processed data, subsequent processing including angle-of-view-related processing, to obtain the first rendered image; and may enable a third thread to perform, based on the angle at which the second user observes the target scene and the non-angle-of-view processed data, subsequent processing including angle-of-view-related processing, to obtain the second rendered image.

Steps S104 and S105 may be performed in parallel or in any order, and steps S106 and S107 may be performed in parallel or in any order.

In the foregoing solution, an example in which a processing order in an image rendering pipeline is a vertex shader, tessellation, a geometry shader, vertex post-processing (including cutting), primitive assembly (including culling), rasterization, a fragment shader, and a per-sample operation is used for description. In actual application, the processing order in the image rendering pipeline may change, and is not specifically limited herein.

Figure 15:
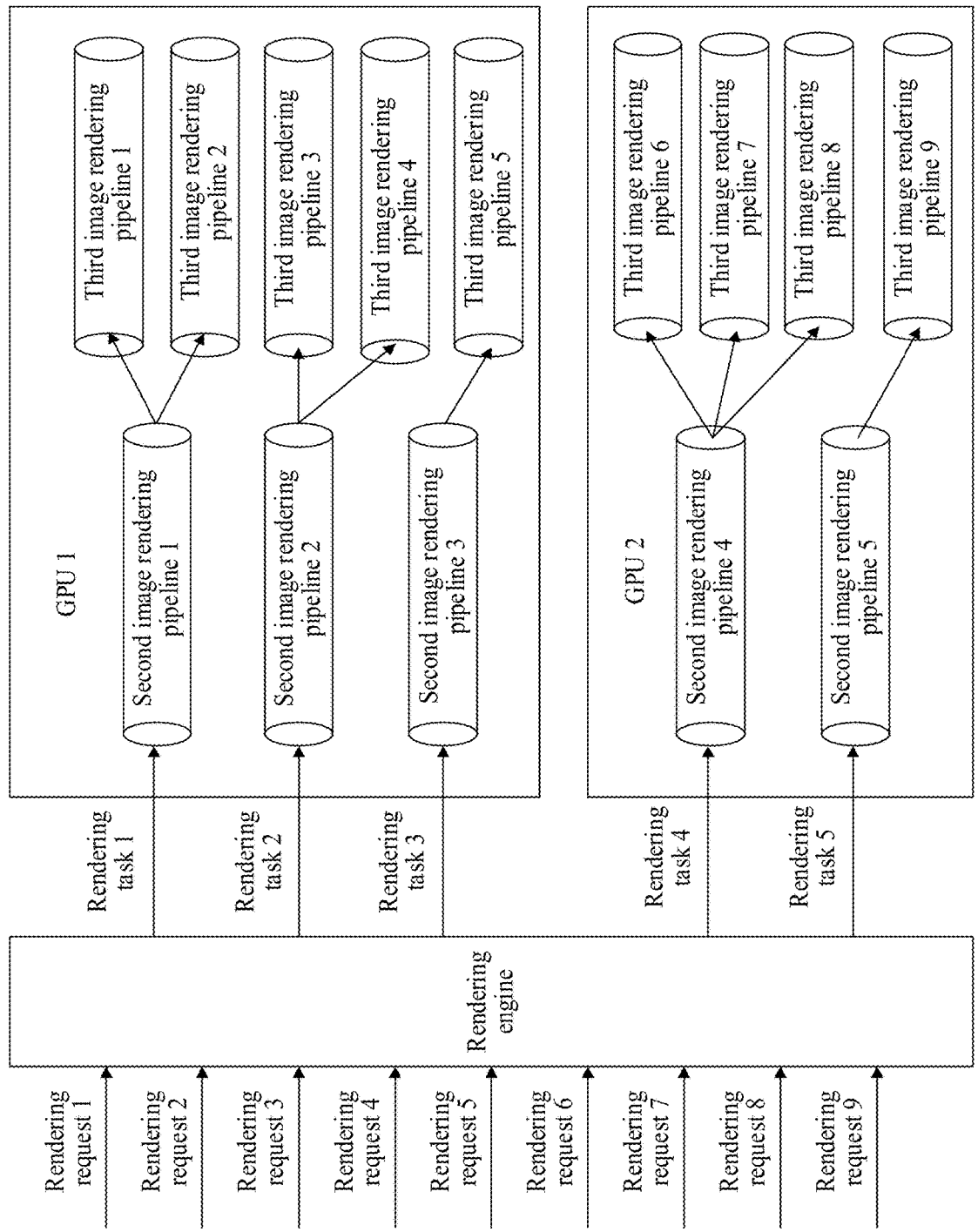
FIG. 15 is a schematic diagram of scheduling a plurality of rendering requests for execution by a plurality of second image rendering pipelines and a plurality of third image rendering pipelines according to this application.

FIG. 15 is a schematic diagram of scheduling a plurality of rendering requests for execution by a plurality of second image rendering pipelines and a plurality of third image rendering pipelines according to this application.

A process in which a remote rendering platform performs rasterization rendering may be as follows: As shown in FIG. 15, after receiving concurrent rendering requests 1 to 9 (not shown in the FIG. 15) sent by rendering application clients, a rendering application server transfers the rendering requests 1 to 9 to a rendering engine.

The rendering engine generates a rendering task 1 on a basis that an identifier that is of a target scene and that is carried in the rendering request 1 and an identifier that is of a target scene and that is carried in the rendering request 2 are the same, invokes a second image rendering pipeline 1 to perform non-angle-of-view-related processing to obtain non-angle-of-view data 1, and separately sends the non-angle-of-view data 1 to a third image rendering pipeline 1 and a third image rendering pipeline 2, to perform subsequent processing including angle-of-view-related processing, to separately obtain a rendered image 1 and a rendered image 2.

The rendering engine generates a rendering task 2 on a basis that an identifier that is of a target scene and that is carried in the rendering request 3 and an identifier that is of a target scene and that is carried in the rendering request 4 are the same, invokes a second image rendering pipeline 2 to perform non-angle-of-view-related processing to obtain non-angle-of-view data 2, and separately sends the non-angle-of-view data 2 to a third image rendering pipeline 3 and a third image rendering pipeline 4, to perform subsequent processing including angle-of-view-related processing, to separately obtain a rendered image 3 and a rendered image 4.

The rendering engine generates a rendering task 3 based on an identifier that is of a target scene and that is carried in the rendering request 5, invokes a second image rendering pipeline 3 to perform non-angle-of-view-related processing to obtain non-angle-of-view data 3, and sends the non-angle-of-view data 3 to a third image rendering pipeline 5, to perform subsequent processing including angle-of-view-related processing, to obtain a rendered image 5.

The rendering engine generates a rendering task 4 on a basis that an identifier that is of a target scene and that is carried in the rendering request 6, an identifier that is of a target scene and that is carried in the rendering request 7, and an identifier that is of a target scene and that is carried in the rendering request 8 are the same, invokes a second image rendering pipeline 4 to perform non-angle-of-view-related processing to obtain non-angle-of-view data 4, and separately sends the non-angle-of-view data 4 to a third image rendering pipeline 6, a third image rendering pipeline 7, and a third image rendering pipeline 8, to perform subsequent processing including angle-of-view-related processing, to separately obtain a rendered image 6, a rendered image 7, and a rendered image 8.

The rendering engine generates a rendering task 5 based on an identifier that is of a target scene and that is carried in the rendering request 9, invokes a second image rendering pipeline 5 to perform non-angle-of-view-related processing to obtain non-angle-of-view data 5, and sends the non-angle-of-view data 5 to a third image rendering pipeline 9, to perform subsequent processing including angle-of-view-related processing, to obtain a rendered image 9.

Figure 16:
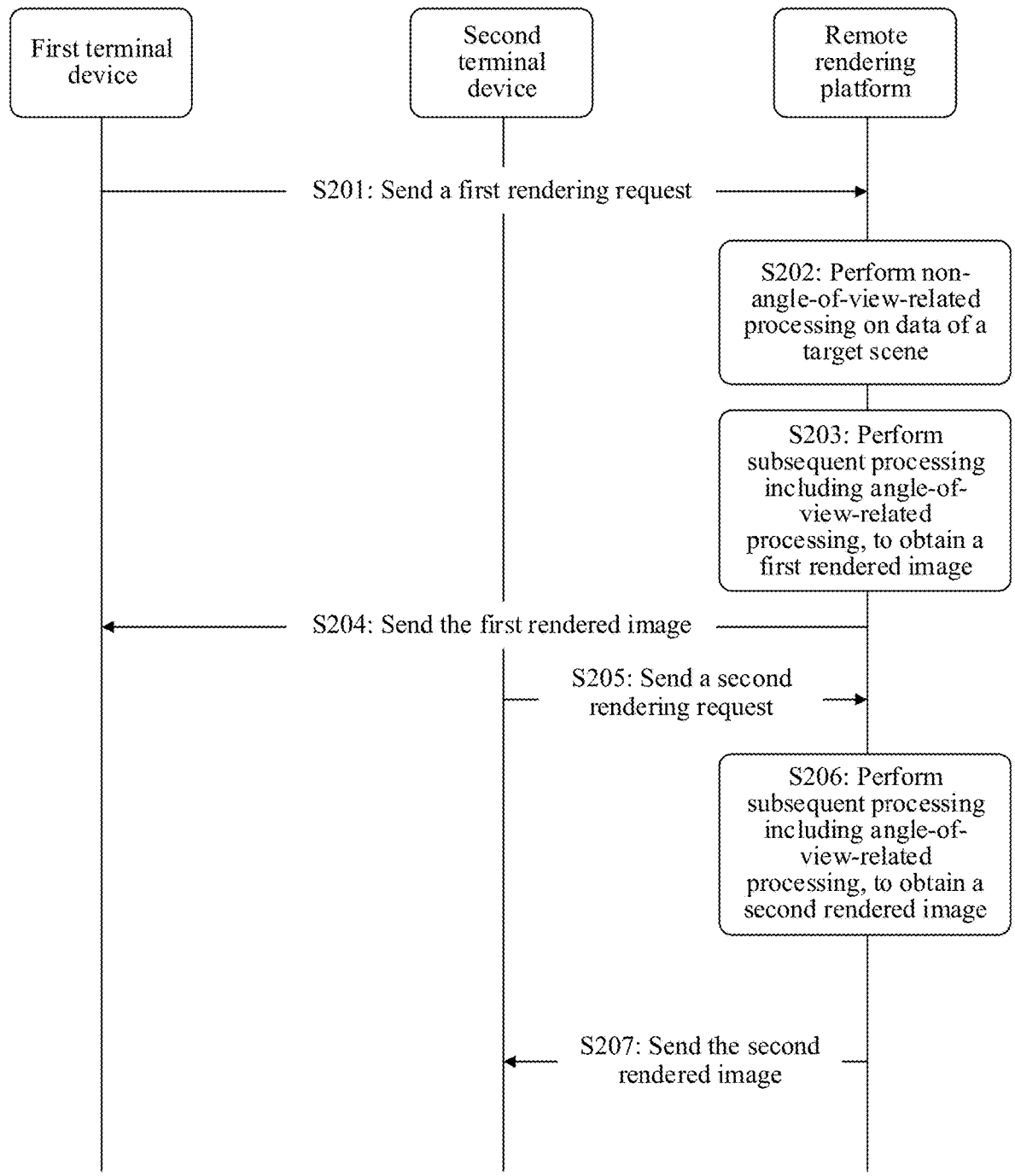
FIG. 16 is a schematic flowchart of a rasterization rendering method according to this application.

FIG. 16 is a schematic flowchart of a rasterization rendering method according to this application. As shown in FIG. 16, the rasterization rendering method in this implementation includes the following steps.

S201: A rendering application client of a first terminal device sends a first rendering request to a rendering application server of a remote rendering platform. Correspondingly, the rendering application server of the remote rendering platform receives the first rendering request sent by the rendering application client of the first terminal device. The first rendering request is used to indicate a target scene and an angle at which a first user observes the target scene.

S202: The remote rendering platform invokes a rendering engine to invoke, based on the first rendering request, a second image rendering pipeline to perform non-angle-of-view-related processing on data of the target scene, to obtain non-angle-of-view processed data.

S203: The remote rendering platform invokes the rendering engine to perform, based on the angle at which the first user observes the target scene and the non-angle-of-view processed data, subsequent processing including angle-of-view-related processing, to obtain a first rendered image.

S204: The rendering application server of the remote rendering platform sends the first rendered image to the rendering application client of the first terminal device. Correspondingly, the rendering application client of the first terminal device receives the first rendered image sent by the rendering application server of the remote rendering platform.

S205: A rendering application client of a second terminal device sends a second rendering request to the rendering application server of the remote rendering platform. Correspondingly, the rendering application server of the remote rendering platform receives the second rendering request sent by the rendering application client of the second terminal device. The second rendering request is used to indicate the target scene and an angle at which a second user observes the target scene.

S206: The remote rendering platform invokes the rendering engine to perform, based on the angle at which the second user observes the target scene and the non-angle-of-view processed data, subsequent processing including angle-of-view-related processing, to obtain a second rendered image.

S207: The rendering application server of the remote rendering platform sends the second rendered image to the rendering application client of the second terminal device. Correspondingly, the rendering application client of the second terminal device receives the second rendered image sent by the rendering application server of the remote rendering platform.

In the foregoing embodiment, definitions of the first rendering request, the second rendering request, the non-angle-of-view-related processing, the angle-of-view-related processing, and the subsequent processing are the same as the definitions of the first rendering request, the second rendering request, the non-angle-of-view-related processing, the angle-of-view-related processing, and the subsequent processing in the rasterization rendering method shown in FIG. 12. For details, refer to the related content in the embodiment corresponding to FIG. 12. Details are not described herein again.

Figure 17:
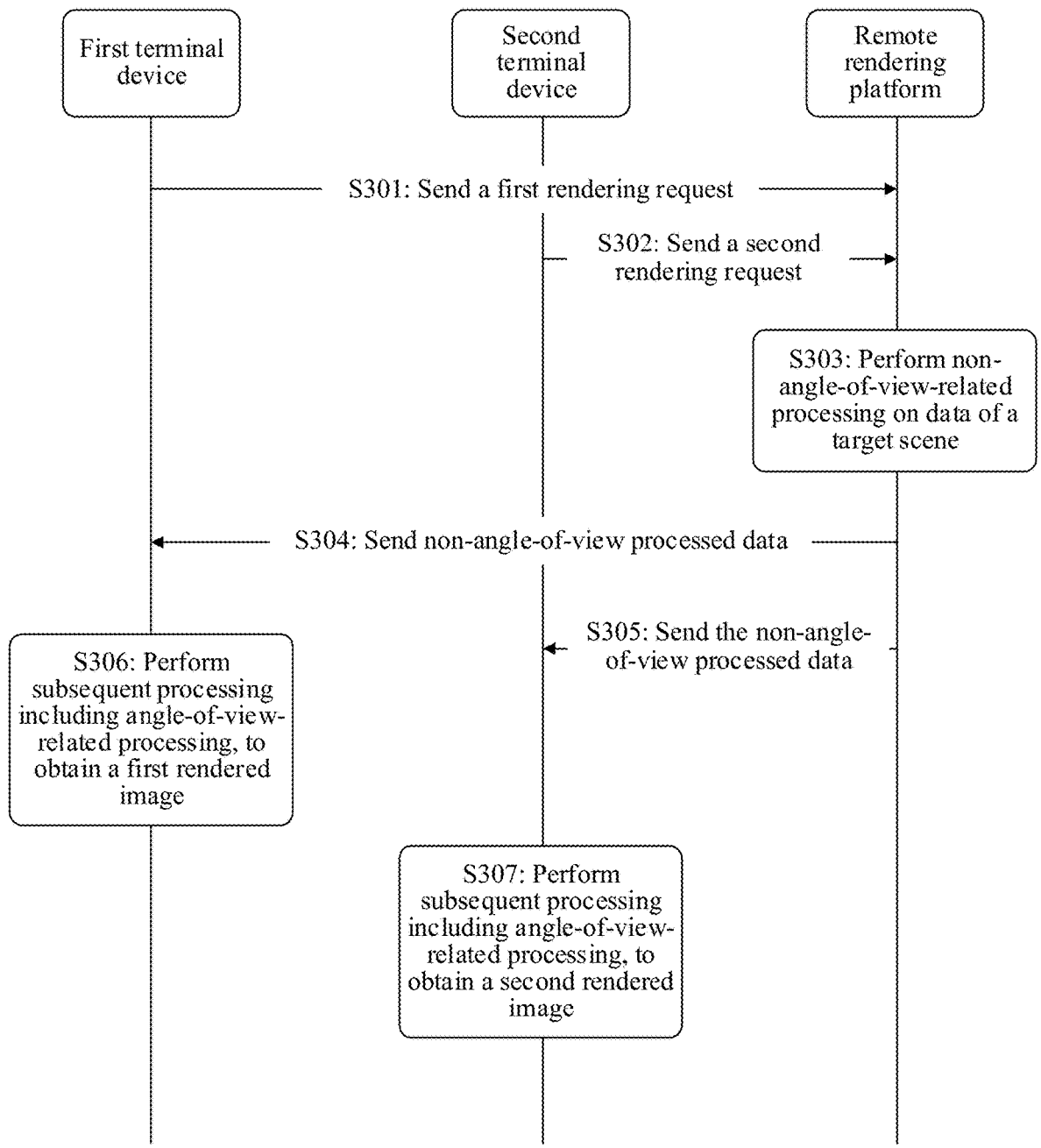
FIG. 17 is a schematic flowchart of a rasterization rendering method according to this application.

FIG. 17 is a schematic flowchart of a rasterization rendering method according to this application. As shown in FIG. 17, the rasterization rendering method in this implementation includes the following steps.

S301: A rendering application client of a first terminal device sends a first rendering request to a rendering application server of a remote rendering platform. Correspondingly, the rendering application server of the remote rendering platform receives the first rendering request sent by the rendering application client of the first terminal device. The first rendering request is used to indicate a target scene.

S302: A rendering application client of a second terminal device sends a second rendering request to the rendering application server of the remote rendering platform. Correspondingly, the rendering application server of the remote rendering platform receives the second rendering request sent by the rendering application client of the second terminal device. The second rendering request is used to indicate the target scene.

S303: The remote rendering platform invokes, by using a rendering engine, a second image rendering pipeline to perform non-angle-of-view-related processing on data of the target scene, to obtain non-angle-of-view processed data.

S304: The remote rendering platform sends the non-angle-of-view processed data to the rendering application client of the first terminal device. Correspondingly, the rendering application client of the first terminal device receives the non-angle-of-view processed data sent by the remote rendering platform.

S305: The remote rendering platform sends the non-angle-of-view processed data to the rendering application client of the second terminal device. Correspondingly, the rendering application client of the second terminal device receives the non-angle-of-view processed data sent by the remote rendering platform.

S306: The rendering application client of the first terminal device performs subsequent processing including angle-of-view-related processing, to obtain a first rendered image.

S307: The rendering application client of the second terminal device performs subsequent processing including angle-of-view-related processing, to obtain a second rendered image.

Steps S304 and S305 may be performed in parallel or in any order, and steps S306 and S307 may be performed in parallel or in any order.

In the foregoing embodiment, definitions of the first rendering request, the second rendering request, the non-angle-of-view-related processing, the angle-of-view-related processing, and the subsequent processing are the same as the definitions of the first rendering request, the second rendering request, the non-angle-of-view-related processing, the angle-of-view-related processing, and the subsequent processing in the rasterization rendering method shown in FIG. 12. For details, refer to the related content in the embodiment corresponding to FIG. 12. Details are not described herein again.

Figure 18:
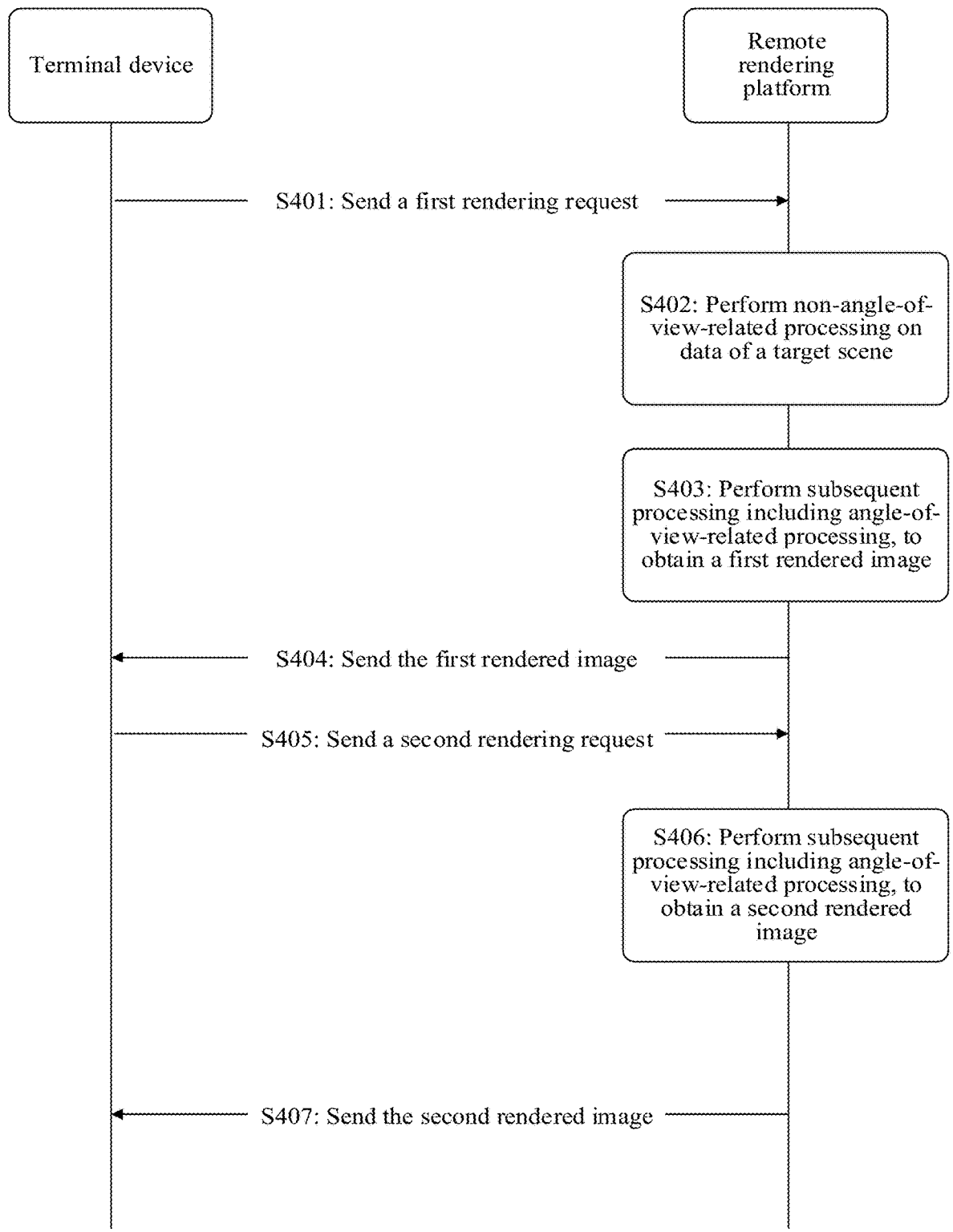
FIG. 18 is a schematic flowchart of a rasterization rendering method according to this application.

FIG. 18 is a schematic flowchart of a rasterization rendering method according to this application. As shown in FIG. 18, the rasterization rendering method in this implementation includes the following steps.

S401: A rendering application client of a terminal device sends a first rendering request to a rendering application server of a remote rendering platform. Correspondingly, the rendering application server of the remote rendering platform receives the first rendering request sent by the rendering application client of the terminal device. The first rendering request is used to indicate a target scene and a first angle at which a user observes the target scene.

S402: The remote rendering platform invokes, by using a rendering engine, a second image rendering pipeline to perform non-angle-of-view-related processing on data of the target scene, to obtain non-angle-of-view processed data.

S403: The remote rendering platform performs, based on the first angle at which the user observes the target scene and the non-angle-of-view processed data by using the rendering engine, subsequent processing including angle-of-view-related processing, to obtain a first rendered image.

S404: The rendering application server of the remote rendering platform sends the first rendered image to the rendering application client of the terminal device. Correspondingly, the rendering application client of the terminal device receives the first rendered image sent by the rendering application server of the remote rendering platform.

S405: The rendering application client of the terminal device sends a second rendering request to the rendering application server of the remote rendering platform. Correspondingly, the rendering application server of the remote rendering platform receives the second rendering request sent by the rendering application client of the terminal device. The second rendering request is used to indicate the target scene and a second angle at which the user observes the target scene.

S406: The remote rendering platform performs, based on the second angle at which the user observes the target scene and the non-angle-of-view processed data by using the rendering engine, subsequent processing including angle-of-view-related processing, to obtain a second rendered image.

S407: The rendering application server of the remote rendering platform sends the second rendered image to the rendering application client of the terminal device. Correspondingly, the rendering application client of the terminal device receives the second rendered image sent by the rendering application server of the remote rendering platform.

In the foregoing embodiment, definitions of the first rendering request, the second rendering request, the non-angle-of-view-related processing, the angle-of-view-related processing, and the subsequent processing are the same as the definitions of the first rendering request, the second rendering request, the non-angle-of-view-related processing, the angle-of-view-related processing, and the subsequent processing in the rasterization rendering method shown in FIG. 12. For details, refer to the related content in the embodiment corresponding to FIG. 12. Details are not described herein again.

Figure 19:
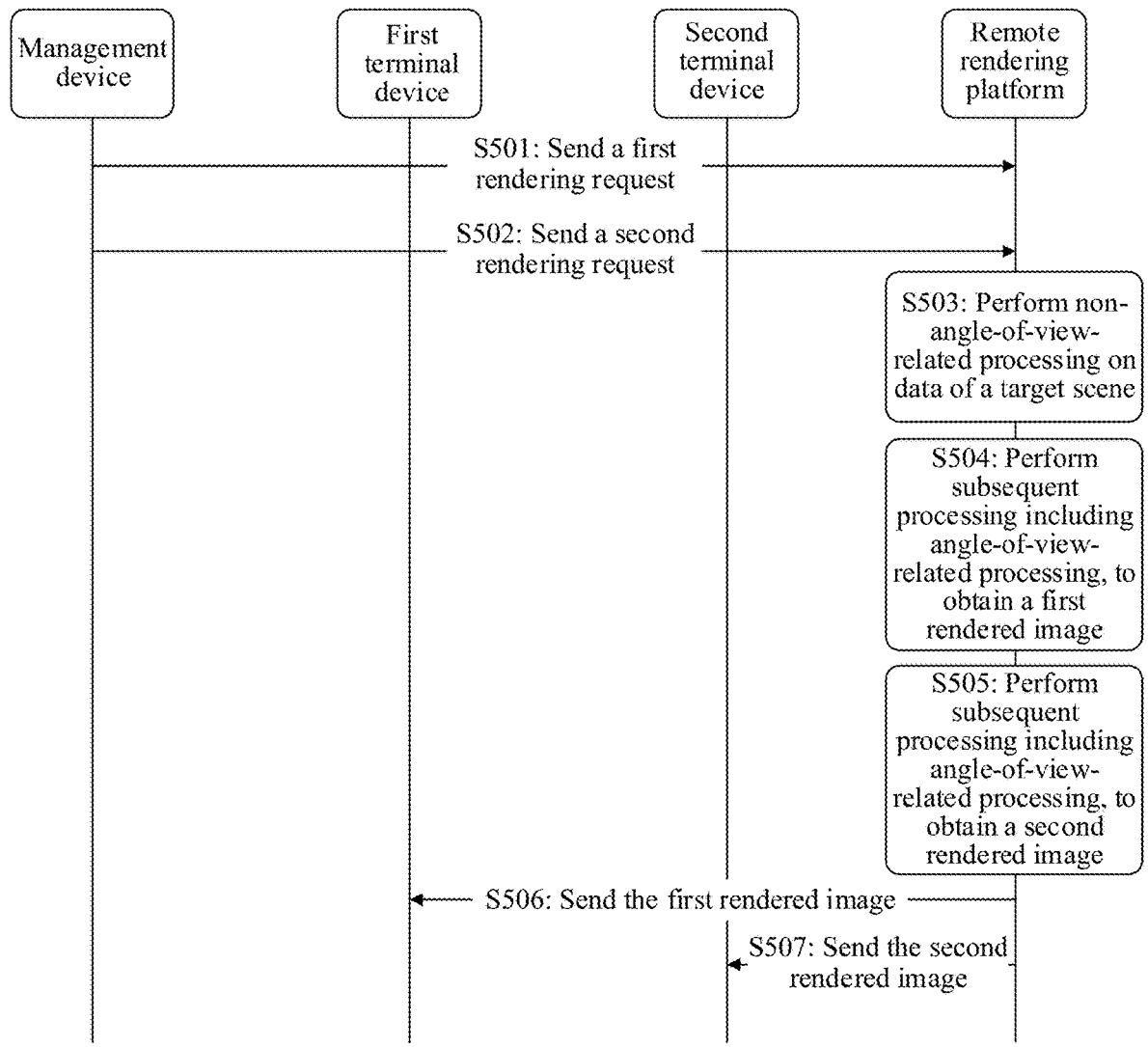
FIG. 19 is a schematic flowchart of a rasterization rendering method according to this application.

FIG. 19 is a schematic flowchart of a rasterization rendering method according to this application. As shown in FIG. 19, the rasterization rendering method in this implementation includes the following steps.

S501: A management device sends a first rendering request to a rendering application server of a remote rendering platform. Correspondingly, the rendering application server of the remote rendering platform receives the first rendering request sent by the management device. The first rendering request is used to indicate a target scene and an angle at which a first user observes the target scene.

S502: The management device sends a second rendering request to the rendering application server of the remote rendering platform. Correspondingly, the rendering application server of the remote rendering platform receives the second rendering request sent by the management device. The second rendering request is used to indicate the target scene and an angle at which a second user observes the target scene.

In a specific embodiment of this application, content included in the second rendering request is similar to the content included in the first rendering request. For details, refer to the description of the first rendering request. Details are not described herein.

S503: A rendering engine of the remote rendering platform invokes a second image rendering pipeline to perform non-angle-of-view-related processing on data of the target scene, to obtain non-angle-of-view processed data.

S504: The remote rendering platform performs, based on the angle at which the first user observes the target scene and the non-angle-of-view processed data by using the rendering engine, subsequent processing including angle-of-view-related processing, to obtain a first rendered image.

S505: The remote rendering platform performs, based on the angle at which the second user observes the target scene and the non-angle-of-view processed data by using the rendering engine, subsequent processing including angle-of-view-related processing, to obtain a second rendered image.

S506: The rendering application server of the remote rendering platform sends the first rendered image to a rendering application client of a first terminal device. Correspondingly, the rendering application client of the first terminal device receives the first rendered image sent by the rendering application server of the remote rendering platform.

S507: The rendering application server of the remote rendering platform sends the second rendered image to a rendering application client of a second terminal device. Correspondingly, the rendering application client of the second terminal device receives the second rendered image sent by the rendering application server of the remote rendering platform.

In the foregoing embodiment, definitions of the first rendering request, the second rendering request, the non-angle-of-view-related processing, the angle-of-view-related processing, and the subsequent processing are the same as the definitions of the first rendering request, the second rendering request, the non-angle-of-view-related processing, the angle-of-view-related processing, and the subsequent processing in the rasterization rendering method shown in FIG. 12. For details, refer to the related content in the embodiment corresponding to FIG. 12. Details are not described herein again.

Figure 20:
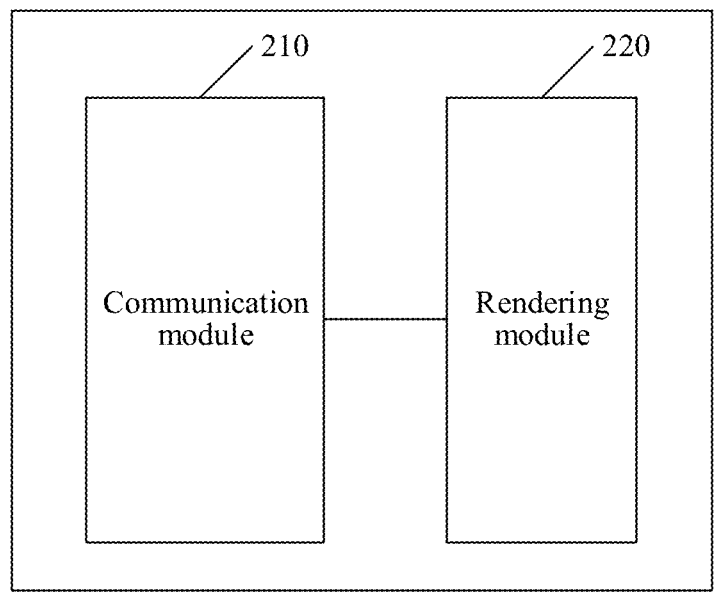
FIG. 20 is a schematic diagram of a structure of a rendering application server according to this application.

FIG. 20 is a schematic diagram of a structure of a rendering application server according to this application. As shown in FIG. 20, the rendering application server in this implementation includes a communication module 210 and a rendering module 220.

The communication module 210 is configured to receive a first rendering request and a second rendering request, where the first rendering request indicates a target scene and a first angle at which the target scene is observed, and the second rendering request indicates the target scene and a second angle at which the target scene is observed.

The rendering module 220 is configured to perform non-angle-of-view-related processing on data of the target scene by using a rendering engine, to obtain non-angle-of-view processed data.

The rendering module 220 is configured to perform, based on the first angle at which the target scene is observed and the non-angle-of-view processed data by using the rendering engine, subsequent processing including angle-of-view-related processing, to obtain a first rendered image.

The rendering module 220 is configured to perform, based on the second angle at which the target scene is observed and the non-angle-of-view processed data by using the rendering engine, subsequent processing including angle-of-view-related processing, to obtain a second rendered image.

In the foregoing embodiment, definitions of the first rendering request, the second rendering request, the non-angle-of-view-related processing, the angle-of-view-related processing, and the subsequent processing are the same as the definitions of the first rendering request, the second rendering request, the non-angle-of-view-related processing, the angle-of-view-related processing, and the subsequent processing in the rasterization rendering method shown in FIG. 12. For details, refer to the related content in the embodiment corresponding to FIG. 12. Details are not described herein again. In addition, the rendering application server shown in FIG. 20 may perform the steps performed by the rendering application server in the remote rendering platform in FIG. 12, FIG. 16, FIG. 17, FIG. 18, and FIG. 19. For details, refer to FIG. 12, FIG. 16, FIG. 17, FIG. 18, and FIG. 19, and the related descriptions. This is not specifically limited herein.

Figure 21:
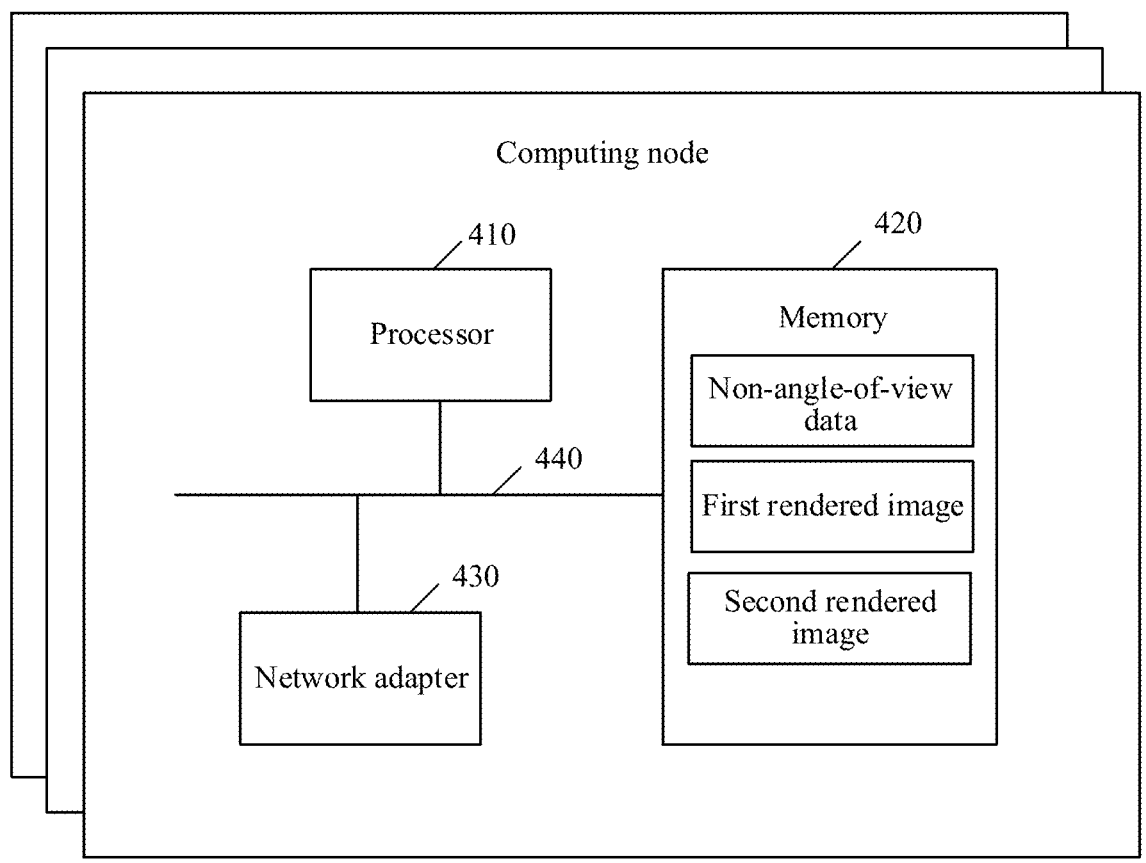
FIG. 21 is a schematic diagram of a structure of a remote rendering platform according to this application.

FIG. 21 is a schematic diagram of a structure of a computing node according to this application. The computing node in this implementation may include a processor 410, a memory 420, a network adapter 430, and a bus 440. The computing node may be specifically the rendering node in FIG. 1A or FIG. 1B.

The processor 410 may be one or more general-purpose processors. The general-purpose processor may be any type of device that can process electronic instructions, and includes CPU, a microprocessor, a microcontroller, a main processor, a controller, an application-specific integrated circuit (ASIC), and the like. The processor 410 executes various types of digital storage instructions, for example, software or firmware programs stored in the memory 420. In a specific embodiment, the processor 410 may be an x86 processor or the like. The processor 410 sends a command to the memory 420 by using a physical interface, to complete a storage-related task.

The memory 420 may include a read-only memory (ROM), a hard disk drive (HDD), or a solid-state disk (SSD). The memory 420 may be configured to store a first quality parameter, a second quality parameter, a first rendered image, a second rendered image, and difference data.

The network adapter 430 is also referred to as a network interface controller, a network interface card, or a local area network (LAN) adapter.

Optionally, the computing node may further include one or more of an input device and an output device. The input device may be a mouse, a keyboard, or the like. The output device may include a display or the like.

It may be understood that the computing node shown in FIG. 21 may perform the steps performed by the remote rendering platform in FIG. 12, FIG. 16, FIG. 17, FIG. 18, and FIG. 19. For details, refer to FIG. 12, FIG. 16, FIG. 17, FIG. 18, and FIG. 19, and the related descriptions. This is not specifically limited herein.

In the foregoing solutions, when the first rendering request and the second rendering request indicate the same target scene, the non-angle-of-view-related processing needs to be performed only once, so that a computing amount required for rendering can be effectively reduced.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the processes or functions according to the embodiments of this application are generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a storage disk, or a magnetic tape), an optical medium (for example, a Digital Versatile Disc (DVD)), or a semiconductor medium (for example, a SSD).

What is claimed is:

1. A method implemented by a rendering application server, wherein the method comprises:
   receiving a first rendering request and a second rendering request, wherein the first rendering request indicates a target scene and a first angle at which the target scene is observed, and wherein the second rendering request indicates the target scene and a second angle at which the target scene is observed;
   performing non-angle-of-view-related processing on data of the target scene, by invoking a target image rendering pipeline, to obtain non-angle-of-view processed data;
   performing, based on the first angle and the non-angle-of-view processed data, first subsequent processing comprising first angle-of-view-related processing to obtain a first rendered image; and
   performing, based on the second angle and the non-angle-of-view processed data, second subsequent processing comprising second angle-of-view-related processing to obtain a second rendered image.

2. The method of claim 1, wherein the target image rendering pipeline comprises an application phase, a geometry phase, and a rasterization phase.

3. The method of claim 1, wherein the non-angle-of-view-related processing does not comprise processing related to the first angle or the second angle.

4. The method of claim 1, wherein the first angle-of-view-related processing comprises first processing related to the first angle, and wherein the second angle-of-view-related processing comprises second processing related to the second angle.

5. The method of claim 1, wherein the non-angle-of-view-related processing comprises one or more of a vertex specification, vertex shader processing, tessellation, or a geometry shader, and wherein the first angle-of-view-related processing or the second angle-of-view-related processing comprises one or more of cutting or culling.

6. The method of claim 1, wherein the first rendering request further comprises either an identifier of the target scene and the first angle, or geometry data, texture data, and material data of some or all grids in the target scene and the first angle.

7. A rendering application server, comprising:
a communication device configured to receive a first rendering request and a second rendering request, wherein the first rendering request indicates a target scene and a first angle at which the target scene is observed, and wherein the second rendering request indicates the target scene and a second angle at which the target scene is observed; and
a rendering device coupled to the communication system and configured to:
perform non-angle-of-view-related processing on data of the target scene, by invoking a target image rendering pipeline using a rendering engine, to obtain non-angle-of-view processed data;
perform, based on the first angle and the non-angle-of-view processed data, first subsequent processing comprising first angle-of-view-related processing to obtain a first rendered image; and
perform, based on the second angle and the non-angle-of-view processed data, second subsequent processing comprising second angle-of-view-related processing to obtain a second rendered image.

8. The rendering application server of claim 7, wherein the rendering device is further configured to invoke a target image rendering pipeline to perform the non-angle-of-view-related processing.

9. The rendering application server of claim 7, wherein the non-angle-of-view-related processing does not comprise processing related to the first angle or the second angle.

10. The rendering application server of claim 7, wherein the first angle-of-view-related processing comprises processing related to the first angle.

11. The rendering application server of claim 7, wherein the second angle-of-view-related processing comprises processing related to the second angle.

12. The rendering application server of claim 7, wherein the non-angle-of-view-related processing comprises one or more of a vertex specification, vertex shader processing, tessellation, or a geometry shader, and wherein the first angle-of-view-related processing or the second angle-of-view-related processing comprises one or more of cutting or culling.

13. The rendering application server of claim 7, wherein the first rendering request comprises either an identifier of the target scene and the first angle, or geometry data, texture data, and material data of some or all grids in the target scene and the first angle.

14. A rendering system, comprising:
a rendering engine deployed on a remote rendering node; and
a rendering application server deployed on the remote rendering node and configured to:
receive a first rendering request comprising a target scene and a first angle of the target scene and a second rendering request, wherein the first rendering request indicates a target scene and a first angle at which the target scene is observed, and wherein the second rendering request indicates the target scene and a second angle at which the target scene is observed;
perform non-angle-of-view-related processing on data of the target scene, by invoking a target image rendering pipeline using a rendering engine, to obtain non-angle-of-view processed data;
perform, based on the first angle and the non-angle-of-view processed data using the rendering engine, first subsequent processing comprising first angle-of-view-related processing to obtain a first rendered image; and
perform, based on the second angle and the non-angle-of-view processed data using the rendering engine, second subsequent processing comprising second angle-of-view-related processing to obtain a second rendered image.

15. The rendering system of claim 14, wherein the target image rendering pipeline comprises an application phase, a geometry phase, and a rasterization phase.

16. The rendering system of claim 14, wherein the non-angle-of-view-related processing does not comprise processing related to the first angle or the second angle.

17. The rendering system of claim 14, wherein the first angle-of-view-related processing comprises processing related to the first angle.

18. The rendering system of claim 14, wherein the second angle-of-view-related processing comprises processing related to the second angle.

19. The rendering system of claim 14, wherein the non-angle-of-view-related processing comprises one or more of a vertex specification, vertex shader processing, tessellation, or a geometry shader, and wherein the first angle-of-view-related processing or the second angle-of-view-related processing comprises one or more of cutting or culling.

20. The rendering system of claim 14, wherein the first rendering request further comprises either an identifier of the target scene and the first angle, or geometry data, texture data, and material data of some or all grids in the target scene and the first angle.

\* \* \* \* \*